(12) United States Patent
Kancharla

(10) Patent No.: US 11,607,805 B2
(45) Date of Patent: *Mar. 21, 2023

(54) ROBOTICS SYSTEMS AND METHODS FOR PENETRATIVE IMAGING OF STRUCTURE'S VERTICAL SURFACE

(71) Applicant: ARoboticsCompany, Inc., Ossining, NY (US)

(72) Inventor: Akaash Reddy Kancharla, Armonk, NY (US)

(73) Assignee: AROBOTICSCOMPANY, INC., Ossining, NY (US)

( * ) Notice: Subject to any disclaimer, the term of this patent is extended or adjusted under 35 U.S.C. 154(b) by 378 days.

This patent is subject to a terminal disclaimer.

(21) Appl. No.: 16/998,492

(22) Filed: Aug. 20, 2020

(65) Prior Publication Data

US 2022/0055210 A1 Feb. 24, 2022

(51) Int. Cl.
*B25J 9/04* (2006.01)
*B25J 9/16* (2006.01)
(Continued)

(52) U.S. Cl.
CPC .............. *B25J 9/162* (2013.01); *B25J 9/042* (2013.01); *B25J 19/027* (2013.01); *G01S 13/885* (2013.01)

(58) Field of Classification Search
CPC ..... B62D 57/024; G01S 15/89; G01S 13/885; G01S 13/888; G01S 13/89; G01S 15/88;
(Continued)

(56) References Cited

U.S. PATENT DOCUMENTS 9,547,094 B2    1/2017  Rinsema et al.
2013/0081294 A1*  4/2013  Eaton ..................... G01B 5/008
                                                   33/503
(Continued)

FOREIGN PATENT DOCUMENTS

KR           101229327 B1    2/2013

OTHER PUBLICATIONS

Nissler et al., Robot-to-Camera Calibration: A Generic Approach Using 6D Detections, 2017, IEEE, p. 299-302 (Year: 2017).*
(Continued)

*Primary Examiner* — McDieunel Marc
(74) *Attorney, Agent, or Firm* — Buckley, Maschoff & Talwalkar LLC

(57) ABSTRACT

A frame body is provided parallel to and proximate with a surface of a structure and extends substantially horizontally from a first side to a second side. A connecting portion is provided to be attached to a cable to provide for vertical movement of the frame body. A robotic arm is affixed proximate to a bottom of the frame body and is able to move horizontally during penetrative imaging of the surface. Moreover, the robotic arm extends to an end proximate with the surface, and a penetrative imaging portion is attached to the robotic arm near the end proximate with the surface. The robotic arm rotates, vertically moving the penetrative imaging portion during penetrative imaging of the surface. In addition, the penetrative imaging portion can be separately rotated about three orthogonal axes of rotation (yaw, pitch, roll) to achieve various angles of approach and orientation to the surface.

20 Claims, 44 Drawing Sheets

(51) Int. Cl.
  *G01S 13/88* (2006.01)
  *B25J 19/02* (2006.01)
(58) Field of Classification Search
  CPC . B25J 5/007; B25J 19/027; B25J 9/162; B25J 9/042; B25J 19/026; B25J 5/04; B25J 9/1689; B25J 9/1679; B25J 11/0065; B25J 11/0075; B25J 11/0085; G05B 19/4155; G05B 2219/40195; G05B 2219/40269; G05B 2219/40169; G05B 2219/45078; A47L 1/02; A47L 2201/00
  See application file for complete search history.

(56) References Cited

U.S. PATENT DOCUMENTS

| | | |
|---|---|---|
| 2020/0108501 A1 | 4/2020 | Hong et al. |
| 2021/0405615 A1* | 12/2021 | Kancharla .......... G05B 19/4155 |
| 2022/0178849 A1* | 6/2022 | Kancharla .......... G01N 21/9515 |
| 2022/0219922 A1* | 7/2022 | Aoyagi .................. B65G 59/04 |

OTHER PUBLICATIONS

Cole et al., Design of a robotic system for MRI-guided deep brain stimulation electrode placement, IEEE, 2009, p. 4450-4456 (Year: 2009).*

Onishi et al., PopArm: A robot arm for embodying video-mediated pointing behaviors, 2014, IEEE, p. 137-141 (Year: 2014).*

Nissler et al., A method for hand-eye and camera-to-camera calibration for limited fields of view, 2017, IEEE, p. 5868-5873 (Year: 2017).*

PCT International Search Report and Written Opinion for PCT Application No. PCT/US21/038844, dated Oct. 4, 2021, 9 pp.

Ongpeng, Jason Maximino C. "Contact and Noncontact Ultrasonic Nondestructive Test in Reinforced Concrete Beam" Advances in Civil Engineering, Nov. 1, 2018, vol. 218, Article ID 5783175, 11 pp.

* cited by examiner

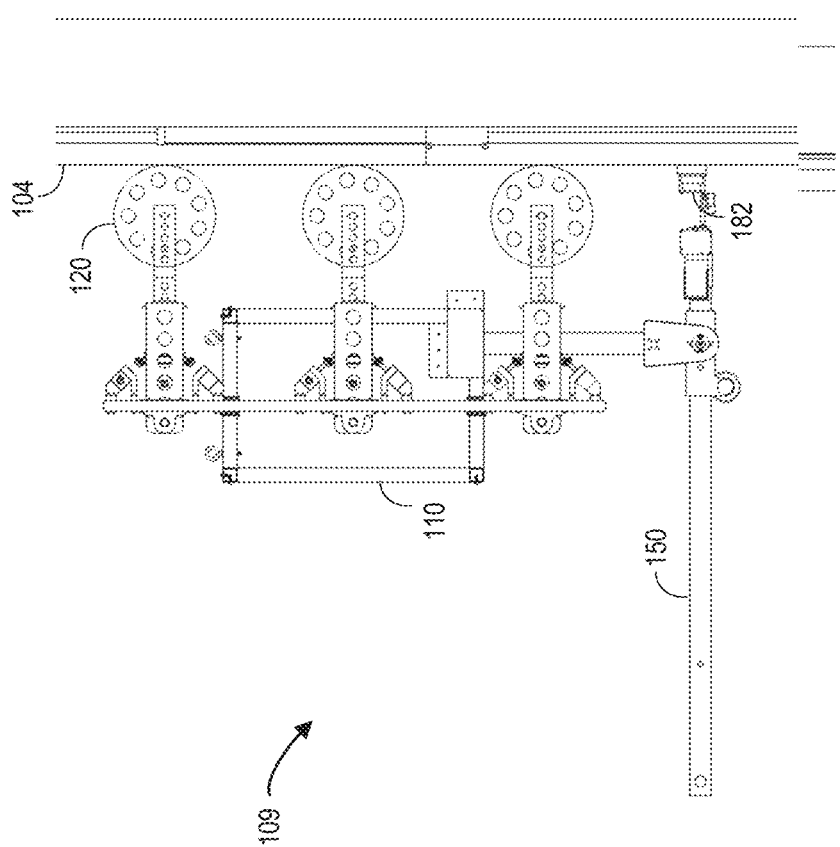

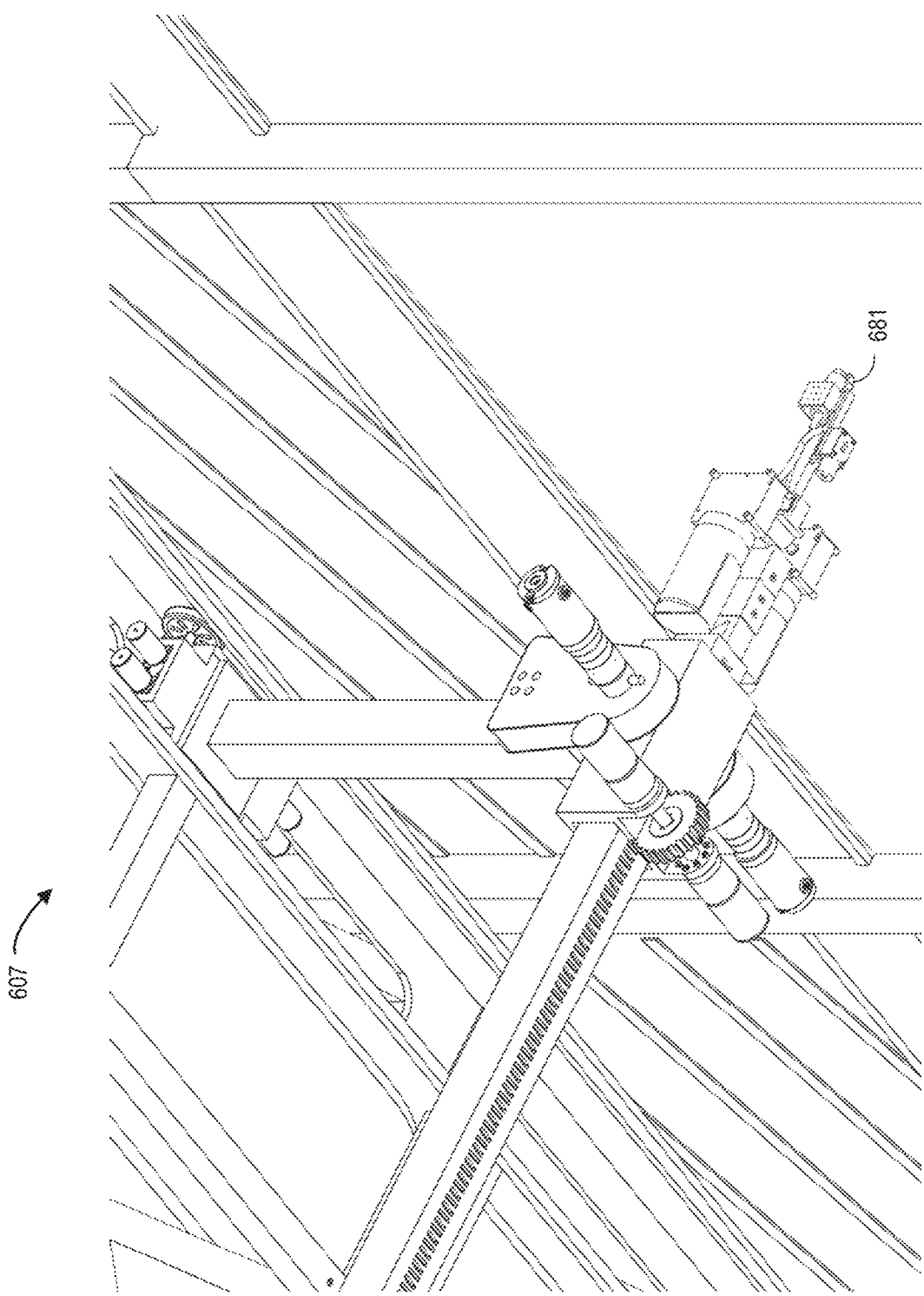

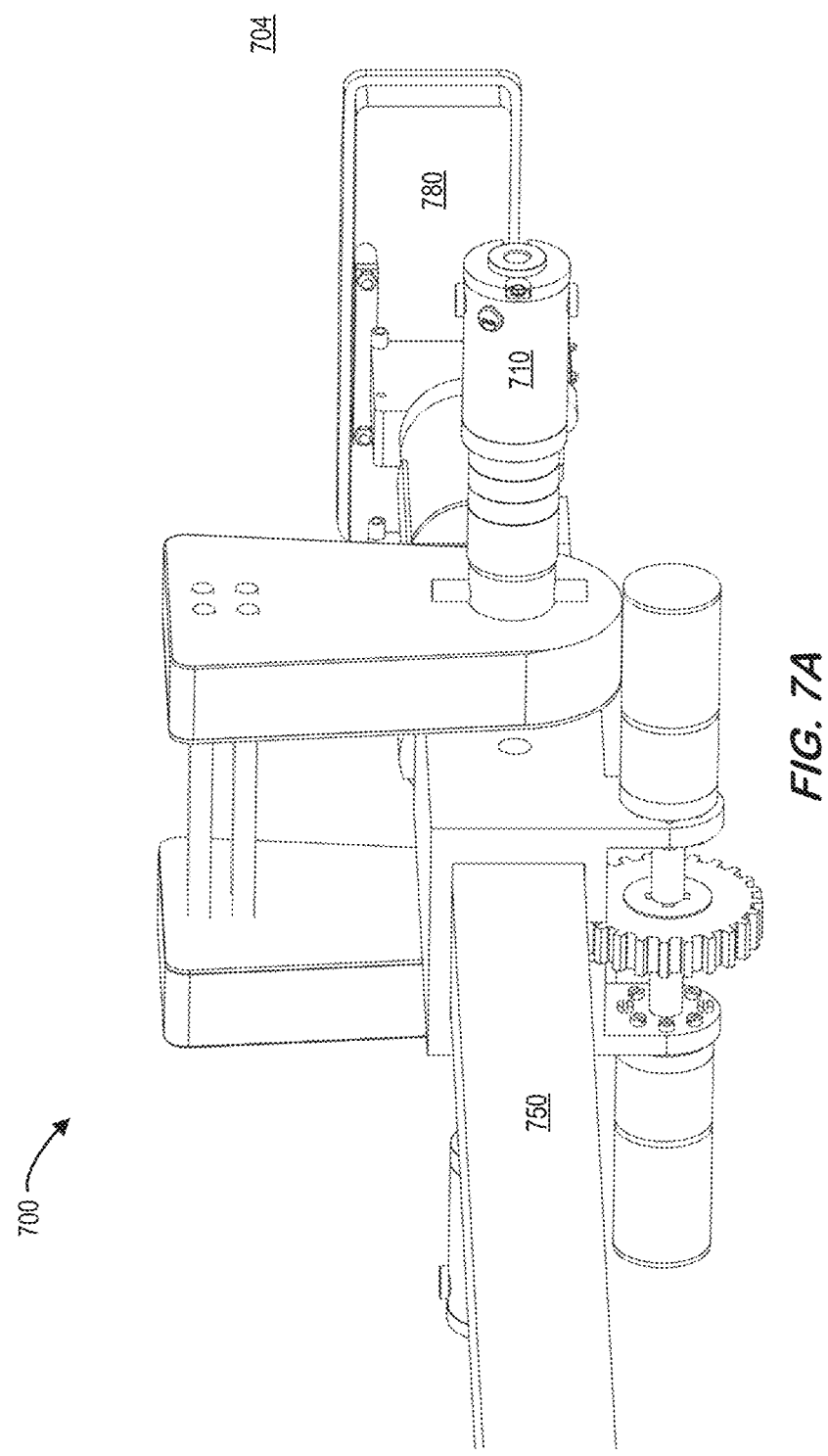

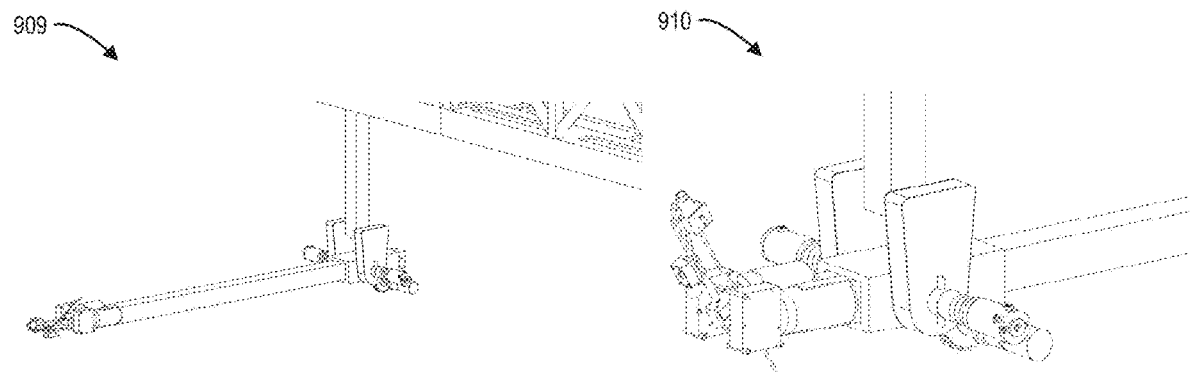
FIG. 9I
FIG. 9J
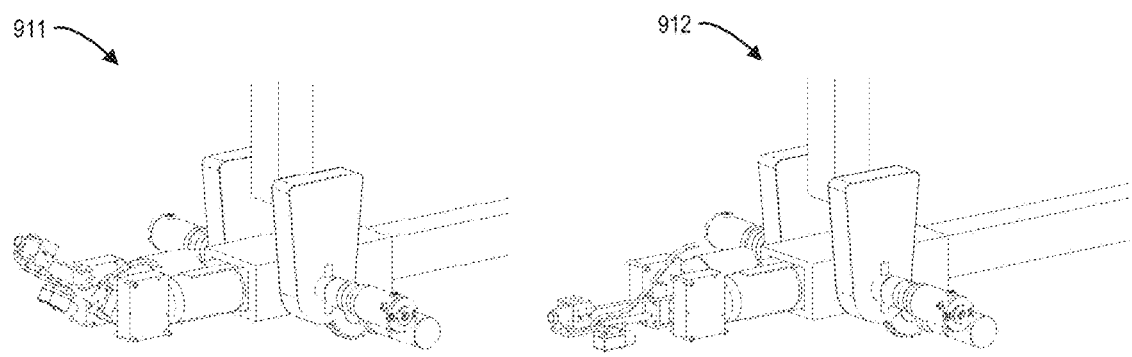
FIG. 9K
FIG. 9L

| PENETRICVE IMAGING SYSTEM IDENTIFIER 1502 | BUILDING IDENTIFIER 1504 | DATE (TIME) 1506 | OPERATOR IDENTIFIER 1508 | RECORDED MOVEMENTS 1510 |
|---|---|---|---|---|
| PIS_10001 | B_101 | 7/15/2024 (14:45.40) | O_101 | |
| PIS_10001 | B_101 | 7/16/2024 (13:02.28) | O_102 | |
| PIS_10003 | B_102 | 7/18/2024 (08:28.32) | O_101 | |

ROBOTICS SYSTEMS AND METHODS FOR PENETRATIVE IMAGING OF STRUCTURE'S VERTICAL SURFACE

TECHNICAL FIELD

Some embodiments are directed to inspection-related penetrative imaging of surfaces of a structure. In particular, embodiments disclose robotic systems and methods for penetrative imaging of a structure's substantially vertical surfaces.

BACKGROUND

The surfaces of any man-made structure will need periodic inspection with respect to their facades, facade cavities, and/or outer structural elements; penetrative imaging and/or scanning can assist with this inspection. For example, the vertical walls of a multi-story office building may need to be periodically inspected looking for cracks or other defects that may exist beneath the surface (e.g., to prevent costly and/or hazardous damage that can result when undetected flaws are not corrected). In some cases, a human operator will use a harness and/or a movable scaffold (e.g., a suspended cradle attached to cables, also referred to as a Building Maintenance Unit ("BMU") or gondola) to manually access and record a penetrating image of the building surface. Such an approach, however, may be associated with substantial risk as the human worker may be injured (or killed) and human error may result in property damage and/or delays. Such risks may increase because the work is physically difficult, and the judgement of a tired worker may become impaired. Moreover, a human inspector will have limited physical capabilities (e.g., reach, visual clarity, field of view, etc.) and may be unable to work in even mildly difficult weather (e.g., wind, rain, fog, snow, etc.).

In some cases, simple devices may be refitted to standard surface maintenance platforms to perform inspection tasks. This approach, however, may be unable to handle complex building surfaces (e.g., with angled recesses, ledges, etc.). They may also be unable to approach the building from any angle therefore deliver suboptimal imaging/scanning. In other cases, drones may be used to access hard to reach areas, but their utility may be limited (e.g., due to weather). These systems are also limited in their load bearing capacity and resilience to external factors (e.g., wind). Additionally, it is generally difficult for human operators to take stable, high quality images to review and corroborate their findings themselves or using existing robots and/or drones. A need, therefore, exists for improved systems and methods to inspect substantially vertical surfaces of structures.

SUMMARY

According to some embodiments, a frame body may be parallel to and proximate with a surface of a structure and extend substantially horizontally from a first side to a second side. A connecting portion may be provided to be attached to a cable to provide for vertical movement of the frame body. A robotic arm may be affixed proximate to a bottom of the frame body and be able to move horizontally during penetrative imaging of the surface. Moreover, the robotic arm may extend to an end proximate with the surface, and a penetrative imaging portion may be attached to the robotic arm near the end proximate with the surface. The robotic arm may rotate, vertically moving the penetrative imaging portion during penetrative imaging of the surface. In addition, the penetrative imaging portion may be separately rotated vertically to remain substantially parallel to and proximate with the surface during rotation of the robotic arm. It may also be operated to approach the building facade from various angles (e.g., 90 degrees above or below a horizontal axis).

Some embodiments comprise: means for placing a penetrative imaging system proximate to a surface, the penetrative imaging system having a frame body parallel to and proximate with the surface and extending substantially horizontally from a first side to a second side; means for moving the penetrative imaging system vertically via at least one connecting portion adapted to be attached to a cable; means for moving a robotic arm, movably affixed proximate to the frame body, horizontally along the frame body; and means for performing penetrative imaging of the surface with a penetrative imaging portion attached to the robotic arm at an end proximate with the surface, wherein the robotic arm is adapted to rotate, vertically moving the penetrative imaging portion during penetrative imaging of the surface, and further wherein the penetrative imaging portion is separately rotated to remain substantially parallel to and proximate with the surface during rotation of the robotic arm. For ledges, cavities, or other exterior elements, the imaging portion can be positioned in various orientations and/or approaches from various vertical and/or horizontal angles; pitch, yaw, and/or roll may be independently controlled.

Some technical advantages of some embodiments disclosed herein are improved systems and methods for penetrative imaging of a structure's substantially vertical surfaces.

BRIEF DESCRIPTION OF THE DRAWINGS

FIGS. 1A through 1D show a penetrative imaging system according to some embodiments.

FIGS. 6A through 6H are more detailed views of a robotic arm in accordance with some embodiments.

FIGS. 7A through 7D are penetrative imaging portions according to some embodiments.

FIG. 15 is a penetrative imaging database according to some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present invention relates to a new and useful robotic system to inspect a surface of a "structure," such as a skyscraper. As used herein, the term "structure" might refer to a building, a multi-story building, an office building, a warehouse, a stadium, a wall, a bridge, a monument, a dam, an apartment building, an airport structure (e.g., a control tower), a man-made structure with at least 10,000 square feet of exterior surfaces, etc. Moreover, the phrase "surface" might be associated with a wall, masonry, brick, stone, steel, concrete, cement, iron and alloys, terracotta, metal, etc.

Figure 1A:
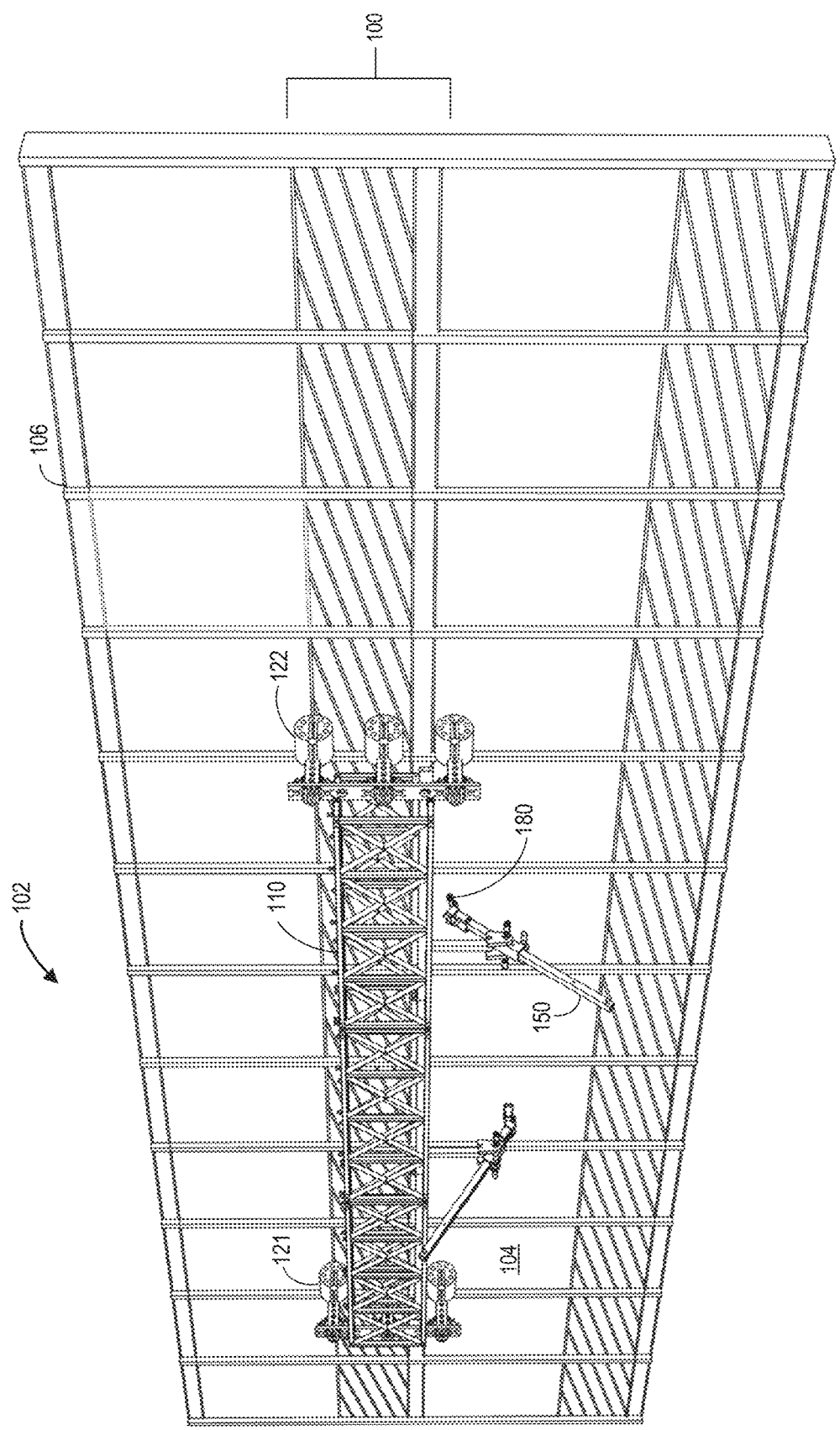

FIG. 1A illustrates 102 a surface 104 (e.g., a wall) of a structure 106 (e.g., a multi-story office building). As shown, a penetrative imaging system 100 may include a frame body 110 according to some embodiments. The frame body 110 may be parallel to and proximate with the surface 104 and extend substantially horizontally from a first side to a second side. A robotic arm 150 may be movably affixed to the frame body 110 (e.g., near the bottom of the frame body 110) and able to move horizontally along the frame body 110 during penetrative imaging of the surface 104. The robotic arm 150 may extend to an end proximate with the surface 104 and a penetrative imaging portion 180 (e.g., a GPR device, an ultrasound device, etc.) may be attached to the robotic arm 150 near the end proximate with the surface 104. According to some embodiments, the robotic arm 150 is adapted to rotate, vertically moving the penetrative imaging portion 180 during penetrative imaging of the surface 104. Moreover, the penetrative imaging portion 180 may be separately rotated to remain substantially parallel to and proximate with the surface 104 during rotation of the robotic arm 150 (e.g., as described with respect to FIGS. 5A through 5D). In some embodiments, the penetrative imaging portion 180 is rotated separately about multiple orthogonal axes of rotation (e.g., pitch, roll, and/or yaw) to achieve various angles of approach and orientation to the surface 104.

As used herein, the phrase "penetrative imaging" might refer to a Ground Penetrating Radar ("GPR") device. A GPR device may, for example, use radar pulses to image a subsurface (e.g., to inspect for hairline cracks, voids, and/or other structural defects). GPR may use electromagnetic radiation in the microwave band (e.g., Ultra High Frequency ("UHF") and or Very High Frequency ("VHF")) of the radio spectrum and detect the reflected signals from subsurface structures. A GPR transmitter and antenna may emit electromagnetic energy into a building surface. When the energy encounters a crack or a boundary between materials having different characteristics, it may be reflected, refracted, and/or scattered back to the surface. A receiving antenna can then record the variations in the return signal to detect defects. Similarly, the phrase "penetrative imaging" might refer to an ultrasound or ultrasonic device. An ultrasound device may, for example, use sound waves with high frequencies (e.g., frequencies from 20 kHz up to several gigahertz) to detect flaws beneath the surface of a building. Other scanning devices, for example Eddy current scanners, may also be used.

In some embodiments, a first set of buffer portions 121 may be located proximate to a first side to move vertically on the surface 104, and a second set of buffer portions 122 may be located proximate to a second side to move vertically on the surface 104. Note that more than two sets of buffer portions 121, 122 may be employed. The first and second sets of buffer portions 121, 122 may, in some embodiments, absorb and distribute impulse via mechanical dampeners and materials. Note that the buffer portion 121, 122 might comprise wheels that roll on the surface 104 or a flat, low-friction foam that slides over the surface 104.

Figure 1B:
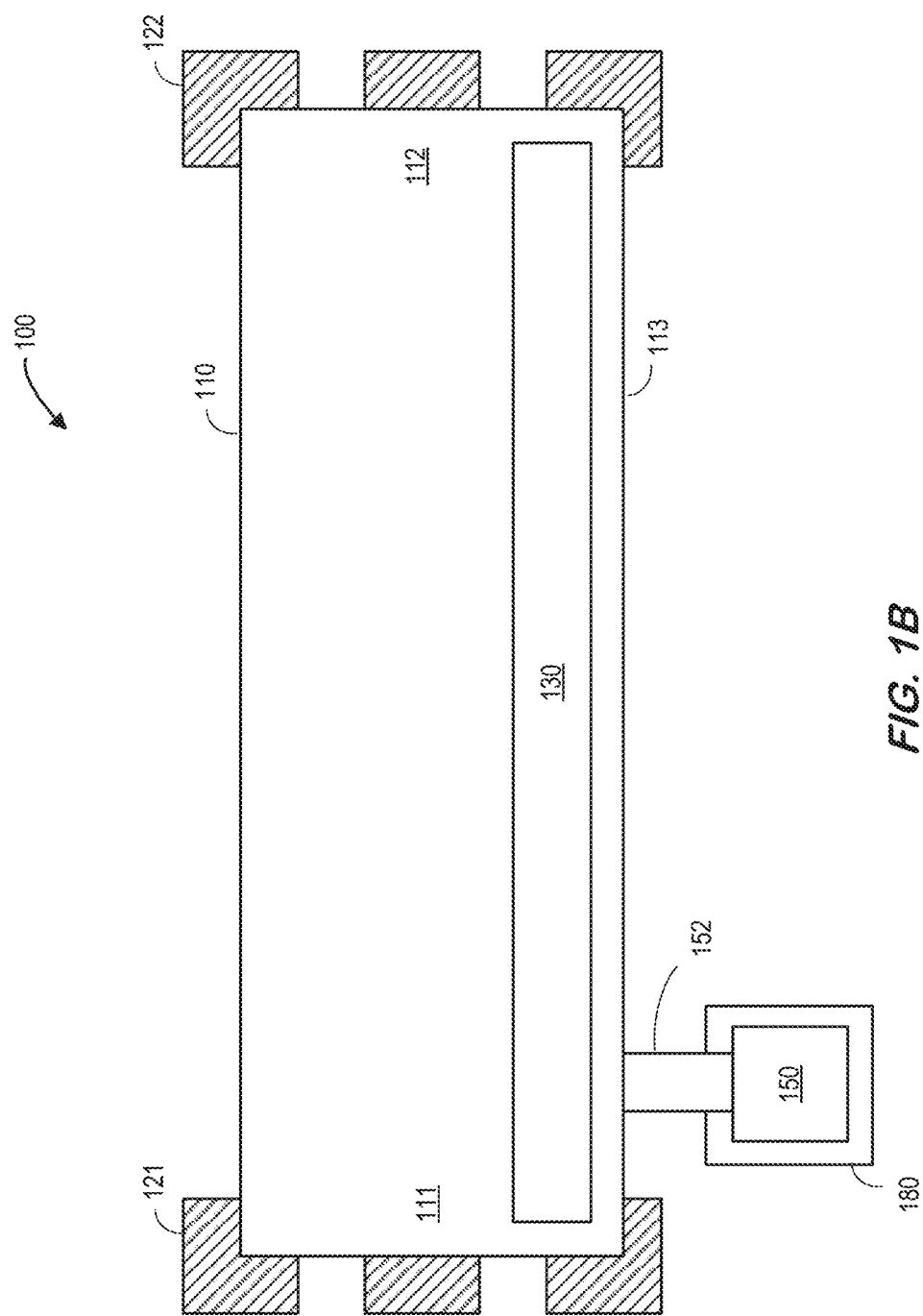

FIG. 1B is another view of the penetrative imaging system 100 in accordance with some embodiments. As before, the frame body 110 may be positioned parallel to and proximate with a surface 104 and extend substantially horizontally from a first side 111 to a second side 112 opposite the first side. The first set of buffer portions 121 may be located proximate to the first side 11 to move vertically on the surface, and the second set of buffer portions 122 may be located proximate to the second side 112 to move vertically on the surface. The robotic arm 150 may be movably affixed via element 152 near a bottom 113 of the frame body 110 and able to move horizontally along the frame body 110 during penetrative imaging of the surface. The robotic arm 150 may extend to an end proximate with the surface and the penetrative imaging portion 180 (e.g., a GPR or ultrasound apparatus) may be attached to the robotic arm 150 near the end proximate with the surface. According to some embodiments, the robotic arm 150 is adapted to rotate, vertically moving the penetrative imaging portion 180 during penetrative imaging of the surface. Moreover, the penetrative imaging portion 180 may be separately rotated to remain substantially parallel to and proximate with the surface during rotation of the robotic arm 150 (e.g., as described with respect to FIGS. 5A through 5D). In some embodiments, the penetrative imaging portion is rotated separately about multiple orthogonal axes of rotation (e.g., pitch, roll, and/or yaw) to achieve various angles of approach and orientation to the surface. The penetrative imaging portion 180 may, in some embodiments, be easily replaceable. As used herein, the term "penetrative imaging" might refer to a Ground Penetrating Radar ("GPR") device, an ultrasound device, etc. Moreover, the penetrative imaging portion 180 may be adapted to apply a substance or several substances onto the vertical surface during penetrative imaging. For example, the substance might comprise an ultrasound gel, blown air (e.g., to remove dust), etc. The substance might be stored in a tank 130 attached to the frame body 130, be received from a tank on a building rooftop via a flexible hose, etc. In some embodiments, multiple tanks 130 might each hold different solutions that could be applied to the surface being imaged. Moreover, the solutions from the liquid storage tanks may flow to and/or from the penetrative imaging portion via a system of pumps and pipes so that the penetrative imaging portion remains operative.

Note that the system's buffer mechanism that holds the robot against a building may disperse load (e.g., across several square feet). Moreover, shock absorbers on the buffers, arm, and internal rail provide from one to five inches of flexibility. Extreme winds of 100 miles per hour may move the robot minimally relative to the dampening threshold. Other possible shocks (e.g., birds) will deliver similarly minimal forces that can be adequately absorbed. Such robust weatherproofing may allow the robot to operate during rain or snow if desired.

In some embodiments, the frame body 110 is modular such that it can be transported more easily (e.g., by two people). For example, the system 100 might consist of a number of frame units (e.g., ten-foot wide segments) which may be joined together, a number of robotic arms 150 (which may sit on the same rail), and two buffers. The frames, arms, and buffers may be considered the "modules" of the system 100. In some embodiments, the system 100 can employ any number of frames, one to four arms, and can vary the buffer size and/or placement to provide design flexibility.

Figure 1C:
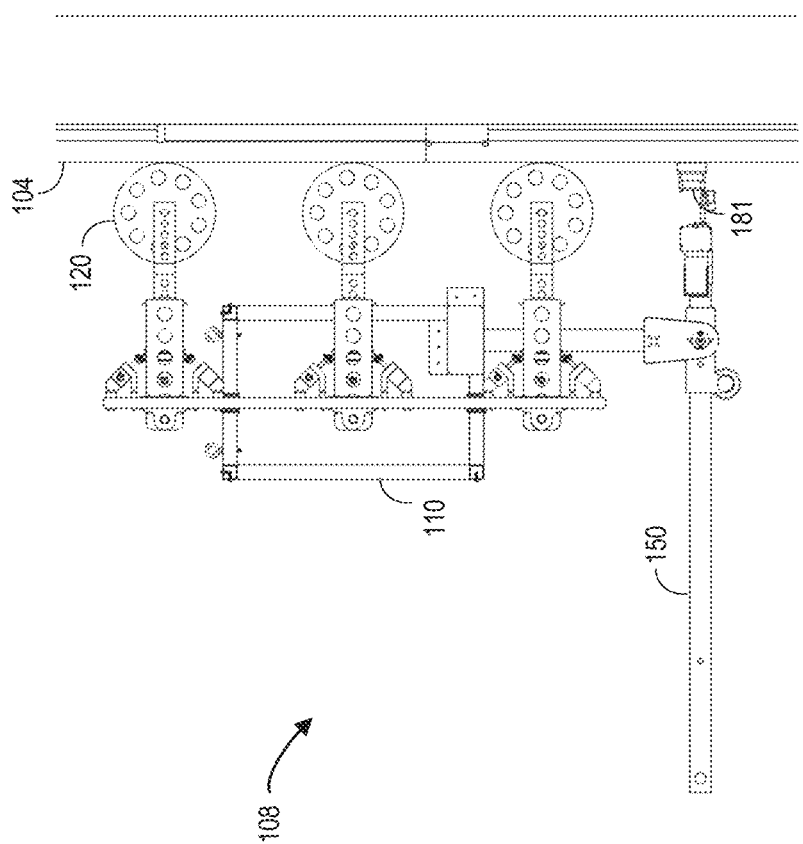

FIG. 1C is a side view 108 showing buffers 120 attached to the frame body 110 supporting the apparatus against the surface 104 being imaged via GPR (e.g., inspected). The robotic arm 150 and GPR penetrative imaging portion 181 are arranged to provide GPR penetrative imaging for the structure. Similarly, FIG. 1D is a side view 109 showing buffers 120 attached to the frame body 110 supporting the apparatus against the surface 104 being imaged via ultrasound (e.g., inspected). The robotic arm 150 and ultrasonic penetrative imaging portion 182 are arranged to provide penetrative imaging for the structure.

Some embodiments may further include cameras to capture images or other information about the surface being imaged and/or the imaging portion in substantially real time (e.g., to help guide a remote human operator who is controlling movement of the system). In some embodiments, the robot may also be outfitted with traditional, infrared, ultraviolet, or other lights to permit safe operation in ambient darkness. Similarly, distance measuring devices and 3-D surface scanning devices, such as Light Detection and Ranging ("LiDAR"), may be employed to determine the location and shape of surface features. For example, the surface may be illuminated with laser light or infrared light to determine three-dimensional information. The cameras and/or other sensors might be attached to the frame body, the robotic arm, a penetrative imaging portion, etc.

Figure 2A:
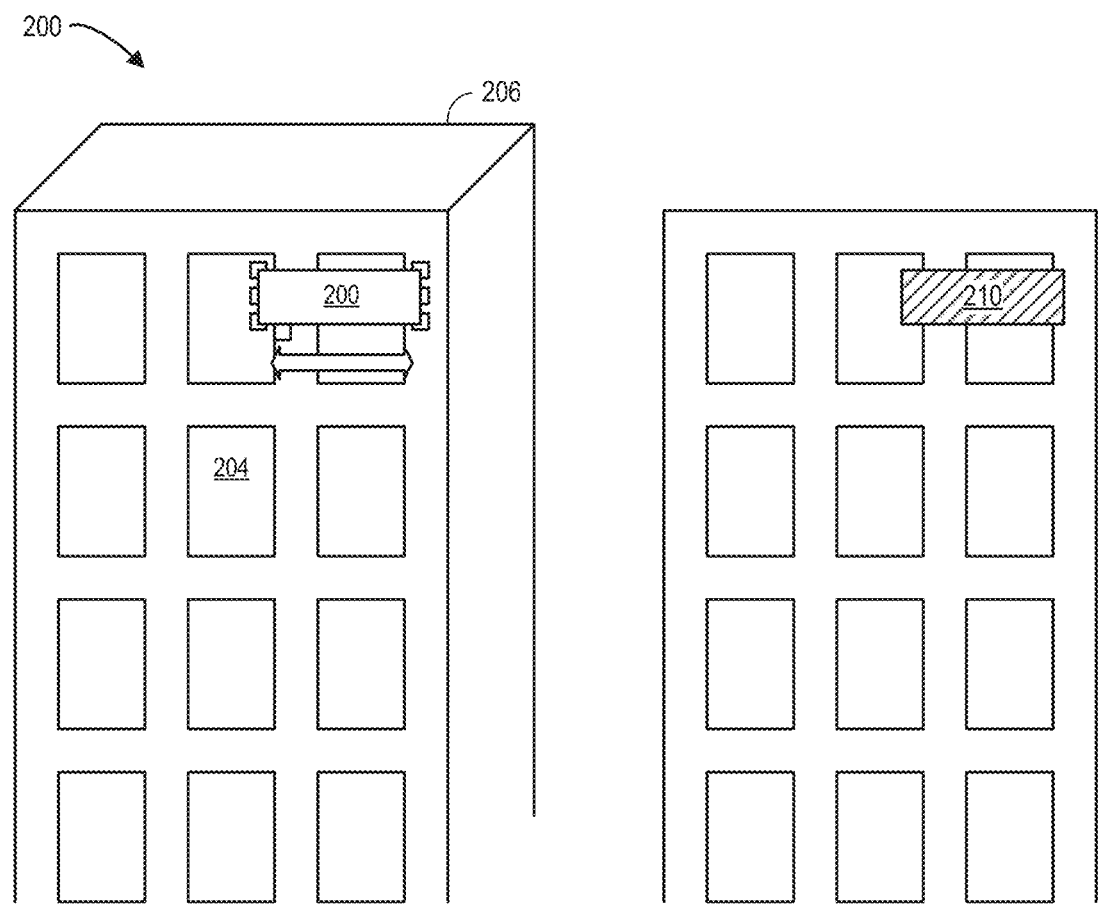
FIGS. 2A and 2B illustrate motion of a penetrative imaging system in accordance with some embodiments.
Figure 2B:
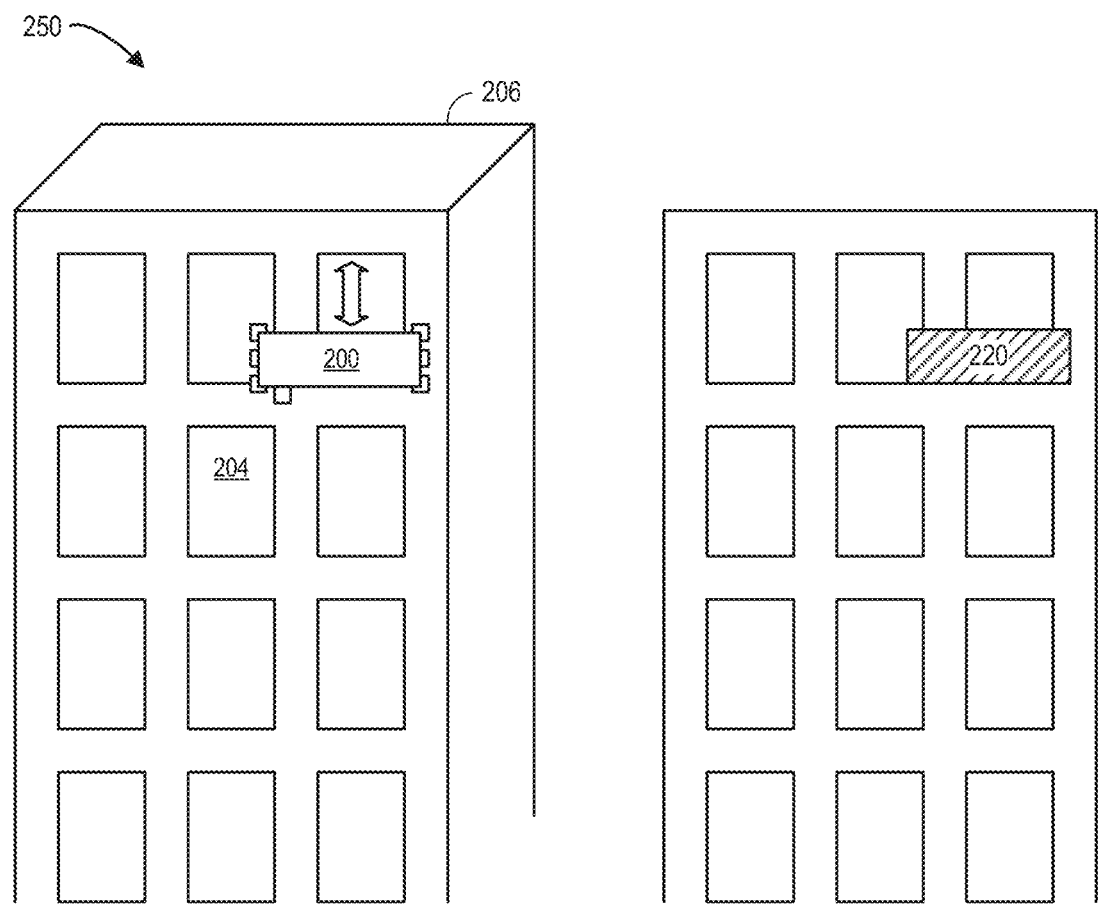

FIGS. 2A and 2B illustrate motion of a penetrative imaging system in accordance with some embodiments. In shown 200 in FIG. 2A, a penetrative imaging system 200 is placed proximate to a surface 204 of a structure 206. A robotic arm may move horizontally along the system 200 (e.g., left-to-right as illustrated by the arrow in FIG. 2A) and rotate to move an inspecting element or other penetrative imaging tool up-and-down. The resulting area 210 imaged is shown by cross-hatching in FIG. 2A. After the area is inspected, FIG. 2B shows 250 that the penetrative imaging system 200 has been lowered down the surface 204 of the structure 206 (as illustrated by the arrow in FIG. 2B). The robotic arm may again move horizontally along the system 200 (e.g., left-to-right) and rotate to move the imaging portion up-and-down. The resulting area 220 inspected is again shown by cross-hatching in FIG. 2B.

Figure 3:
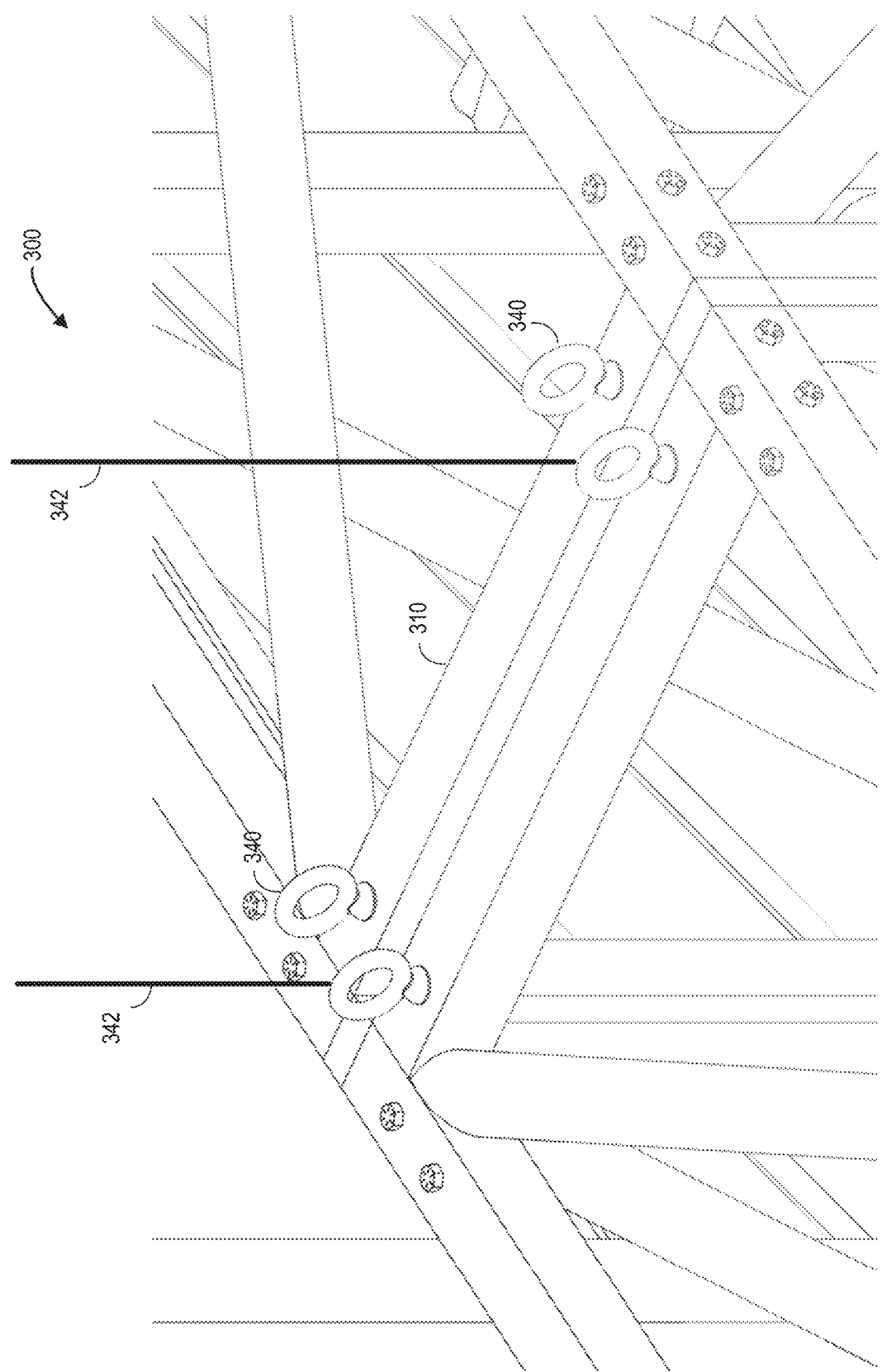
FIG. 3 illustrates connections to a penetrative imaging system according to some embodiments.

The penetrative imaging system 200 may be moved up and/or down the structure 206 using cables. For example, at least one connecting portion on the frame body may be adapted to be attached to a cable to provide for vertical movement of the frame body. FIG. 3 illustrates 300 connections to a penetrative imaging system according to some embodiments. Several hooks 340 attached to a frame body 310 may be attached to cables 342. Although two hooks 340 are shown in FIG. 3, any number of such connecting portions may be provided (and might be positioned to be similar to connecting portions of conventional platforms, such as those used for surface washing). According to some embodiments, at least one connecting portion attaches to the cable 342 via tethering latches and rigs.

Figure 4:
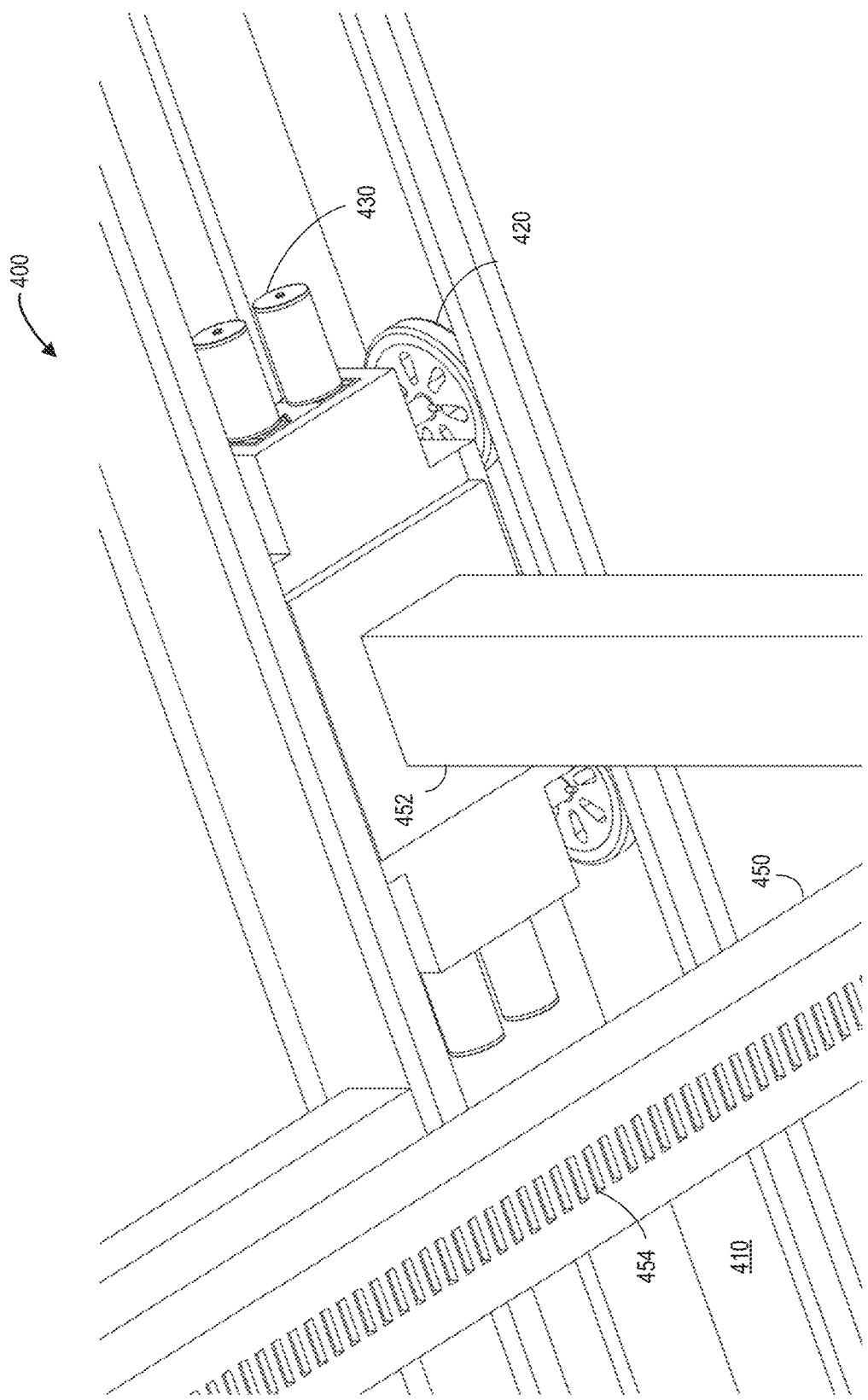
FIG. 4 shows how a robotic arm may be movably affixed to a frame body in accordance with some embodiments.

FIG. 4 shows 400 how a robotic arm 450 may be movably affixed to a frame body 410 via an element 452 in accordance with some embodiments. The robotic arm 450 may have a series of slots or recesses 454 what work with a gear to facilitate movement of the arm as described with respect to FIGS. 5A through 5D. A carriage with wheels 420 may sit within a recess of the frame body 410. According to some embodiments, at least one rotary motor 430 (e.g., four motors 430, one for each wheel 420) may turn the wheels 420 to move the robotic arm 450 horizontally along the frame body 410. That is, the robotic arm 450 may roll horizontally along a rail car and track of the frame body 410 via the rotary motor.

Figure 5A:
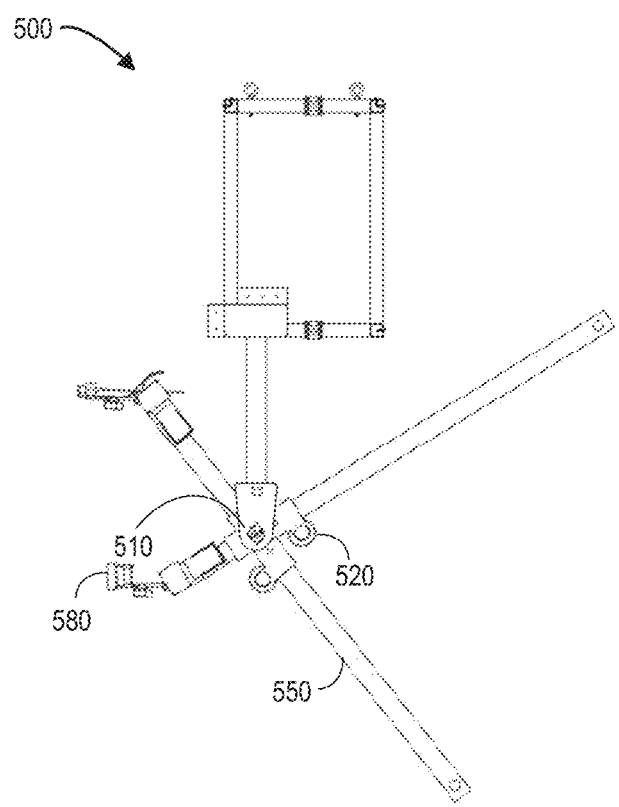
FIGS. 5A through 5D illustrate rotation of a robotic arm according to some embodiments.
Figure 5B:
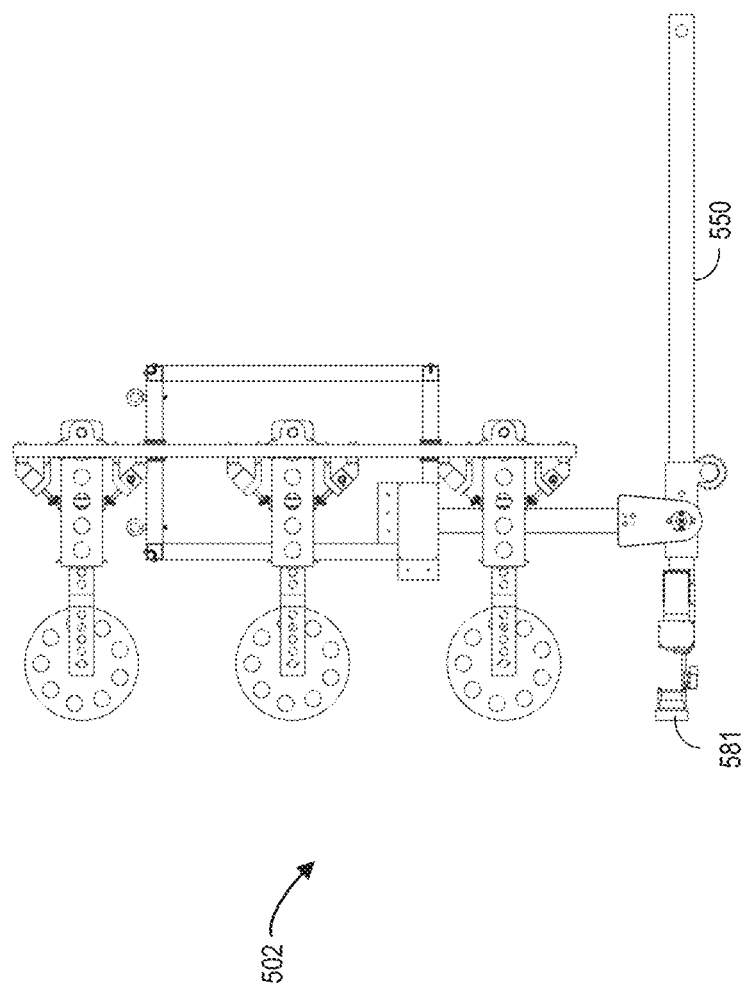
Figure 5C:
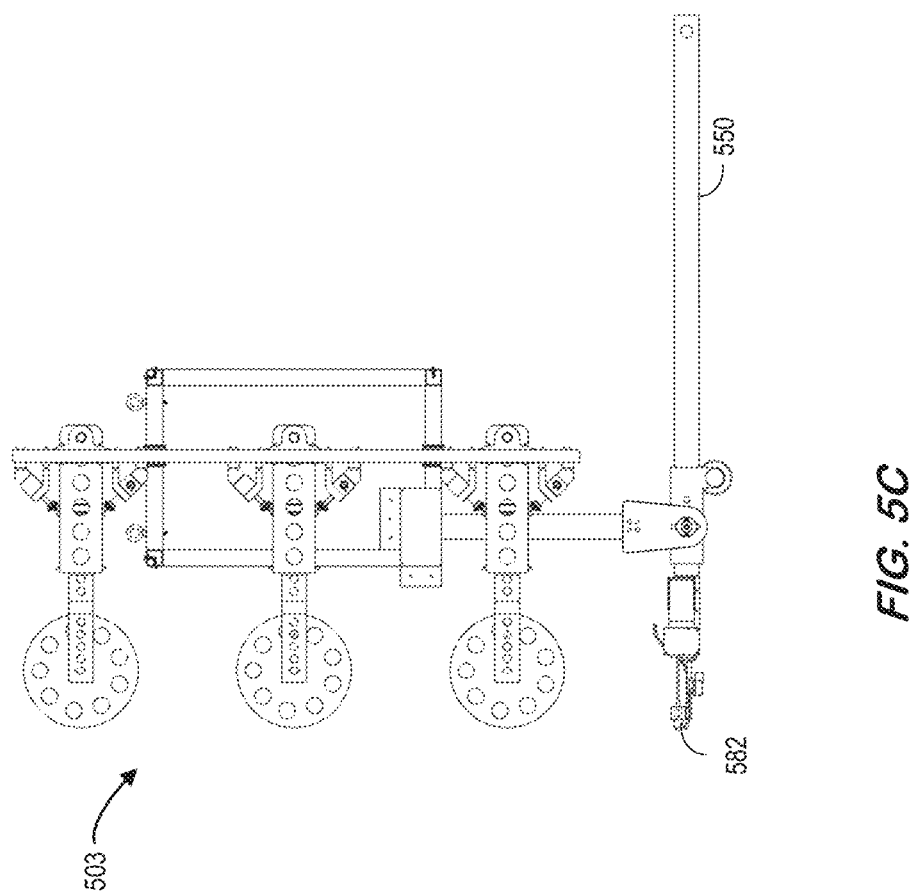
Figure 5D:
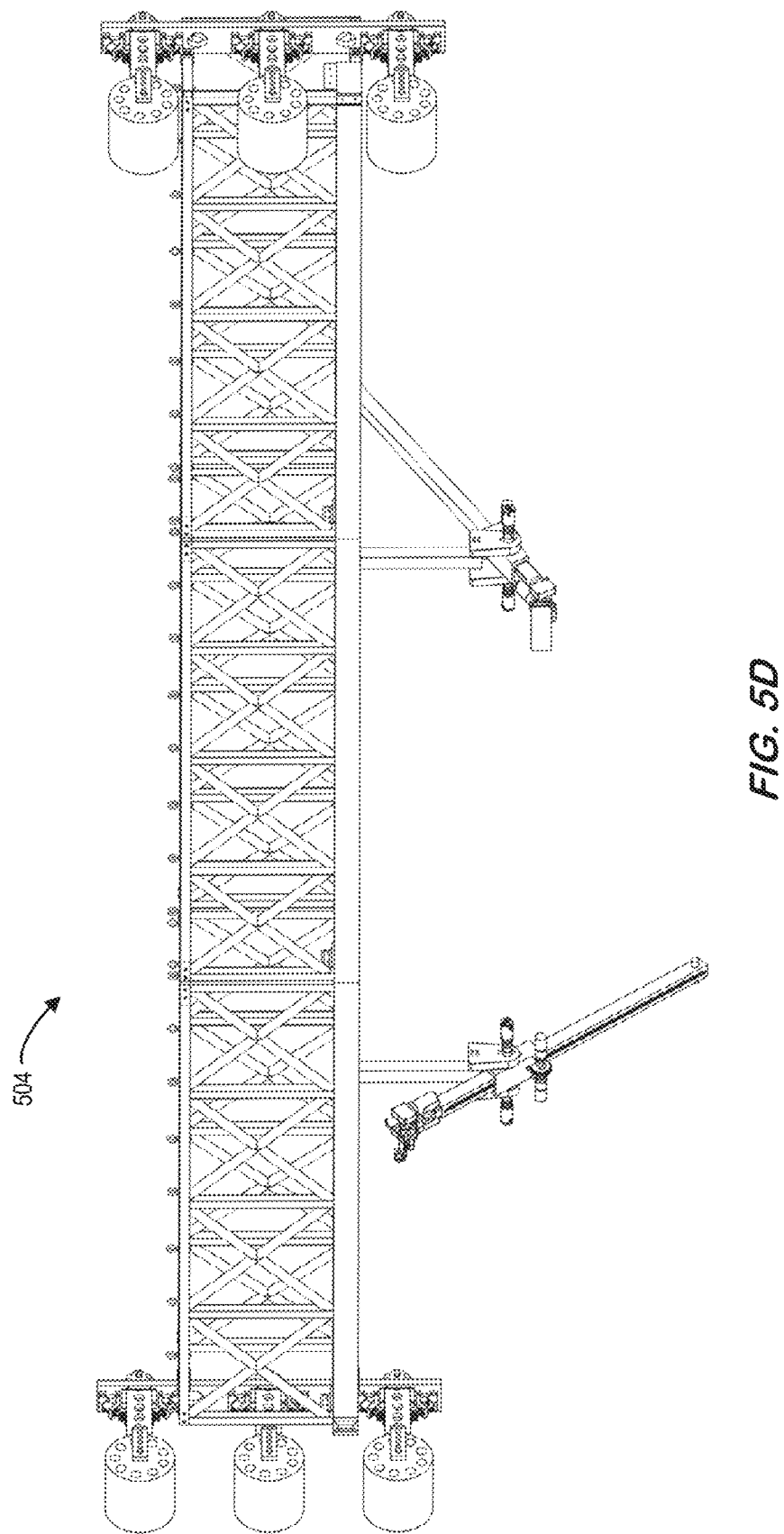
Figure 6A:
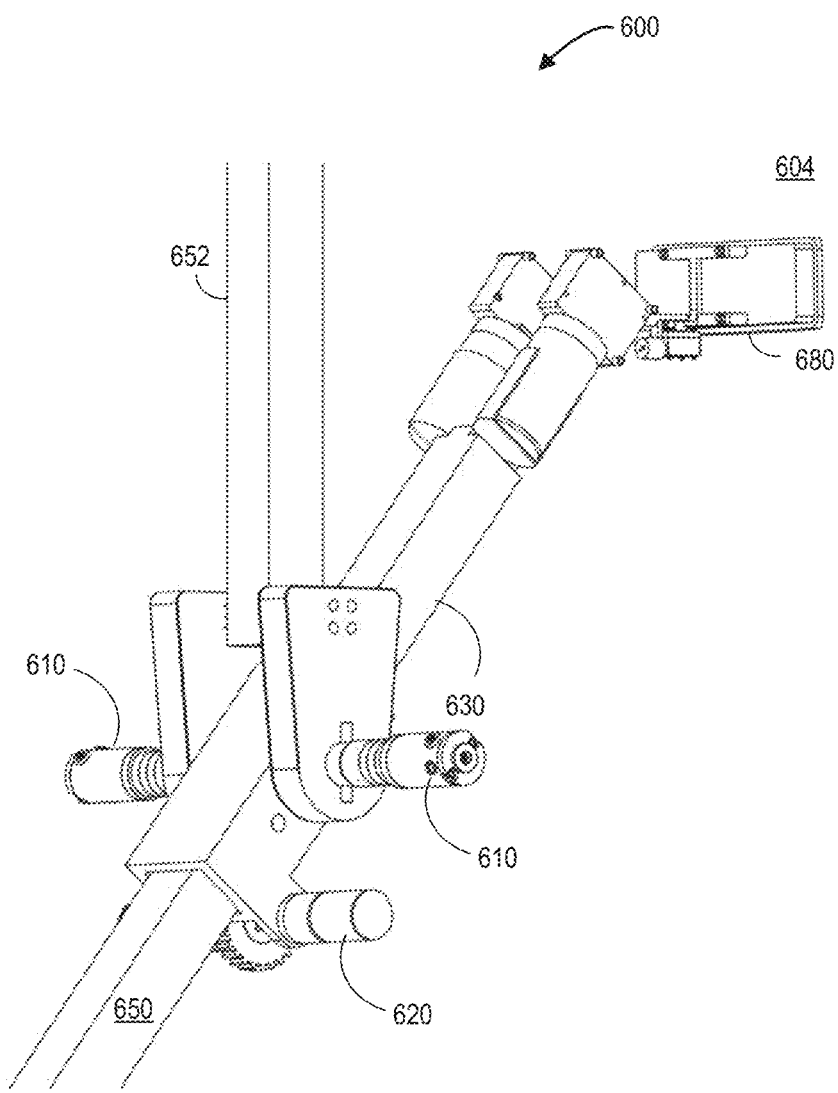
Figure 6B:
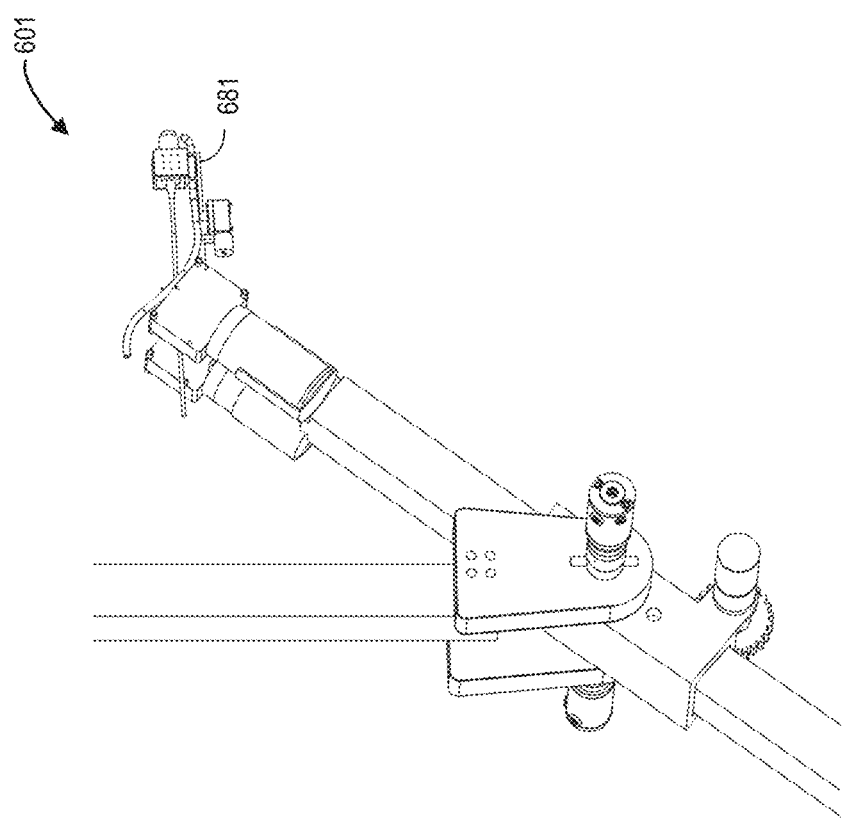
Figure 6C:
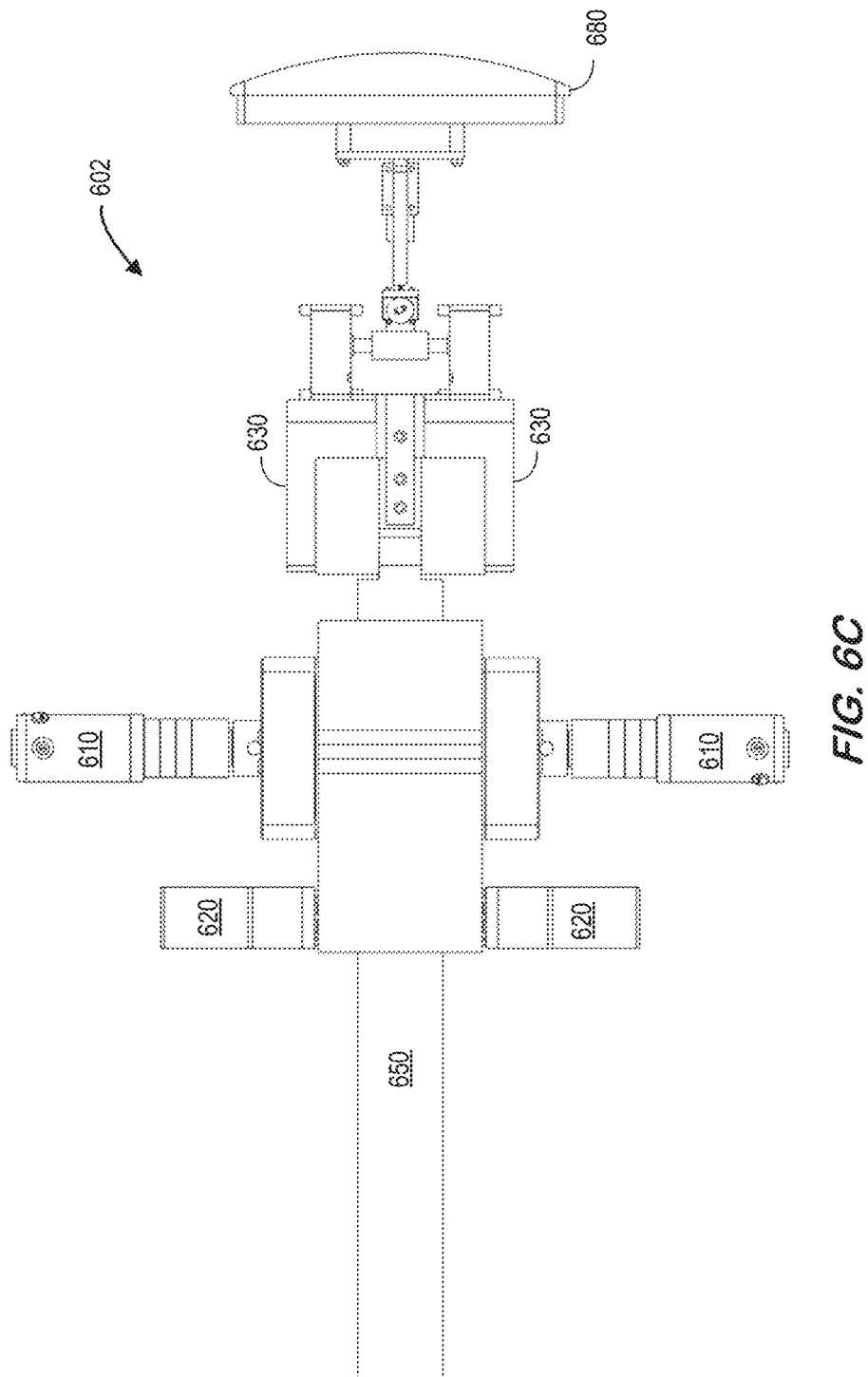
Figure 6D:
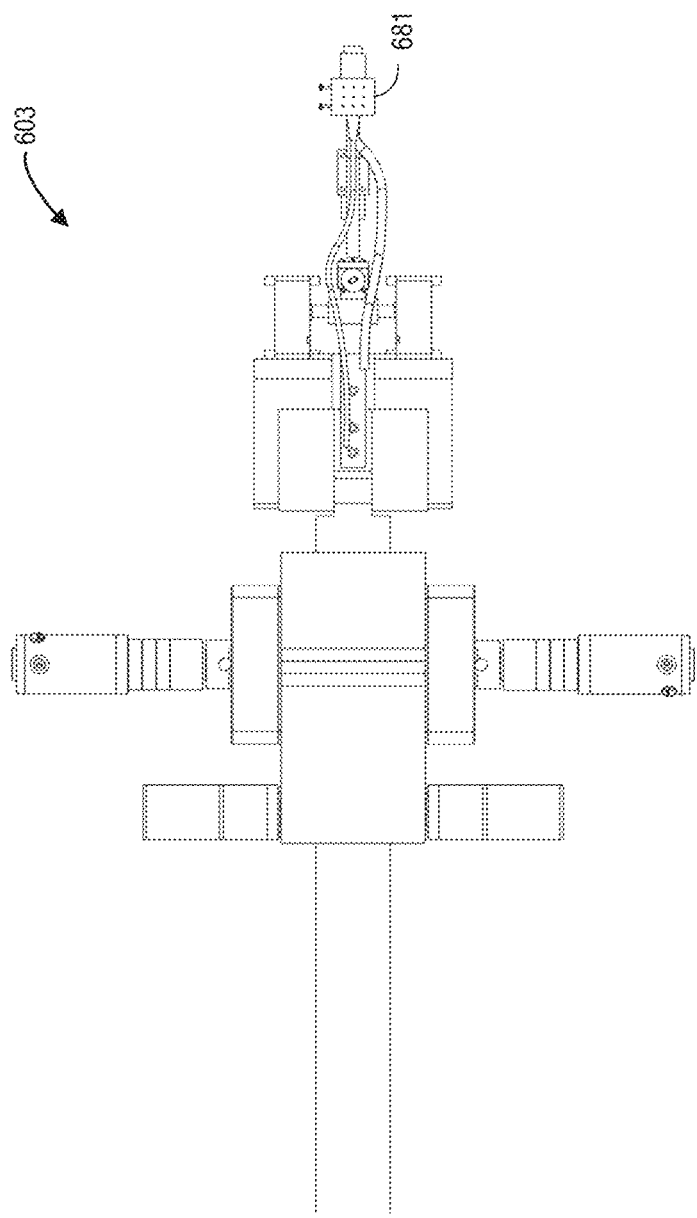
Figure 6E:
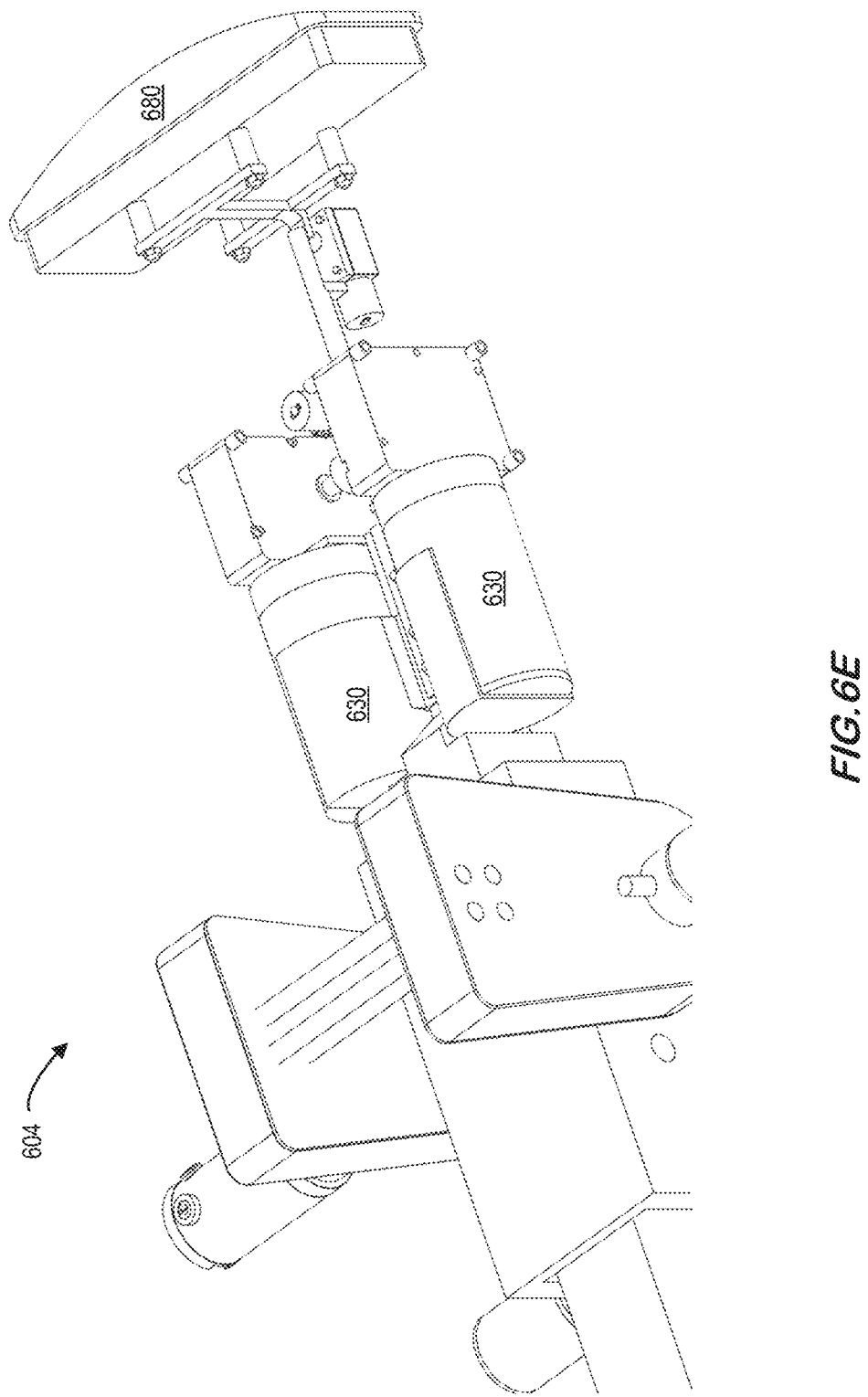
Figure 6F:
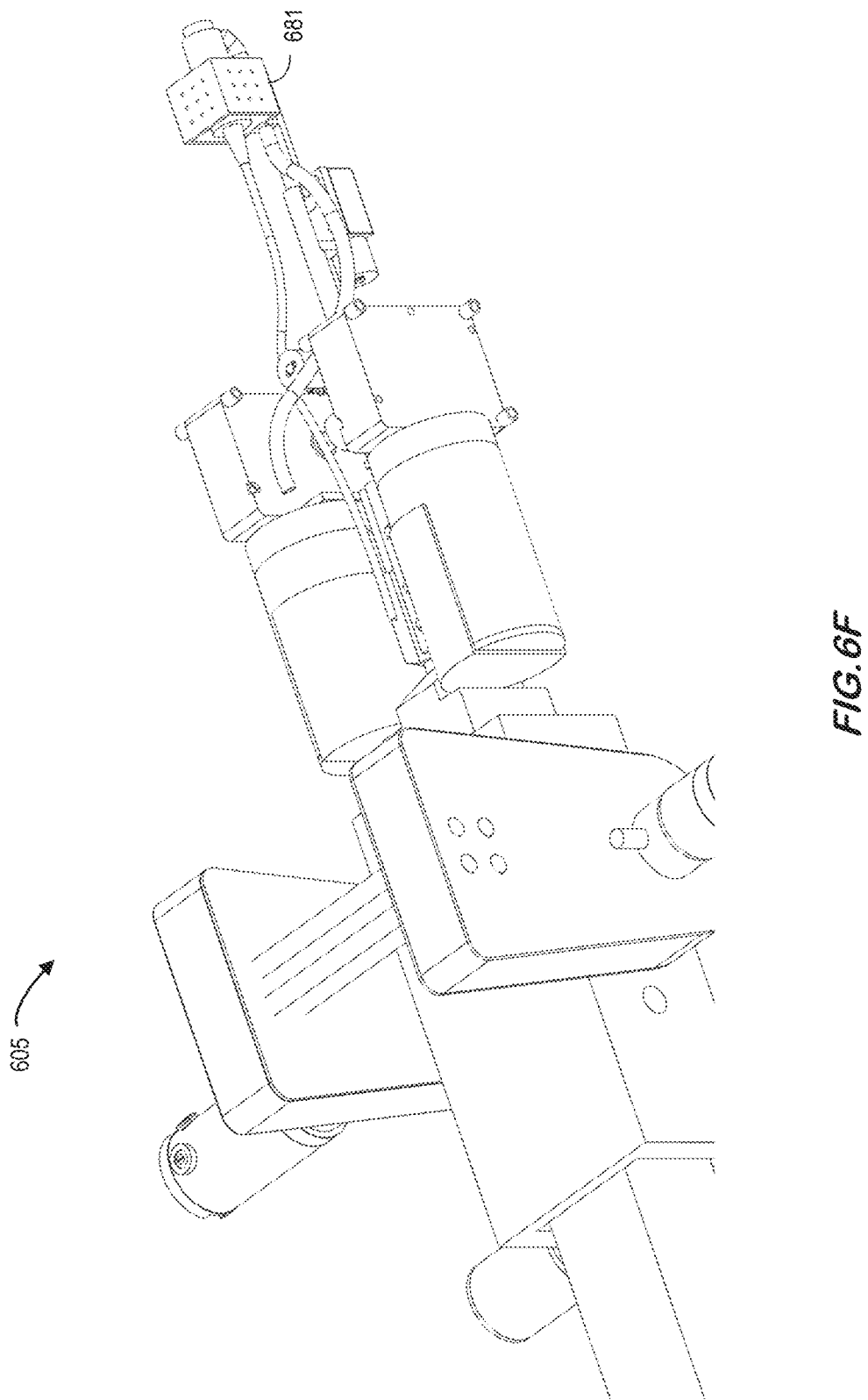
Figure 6G:
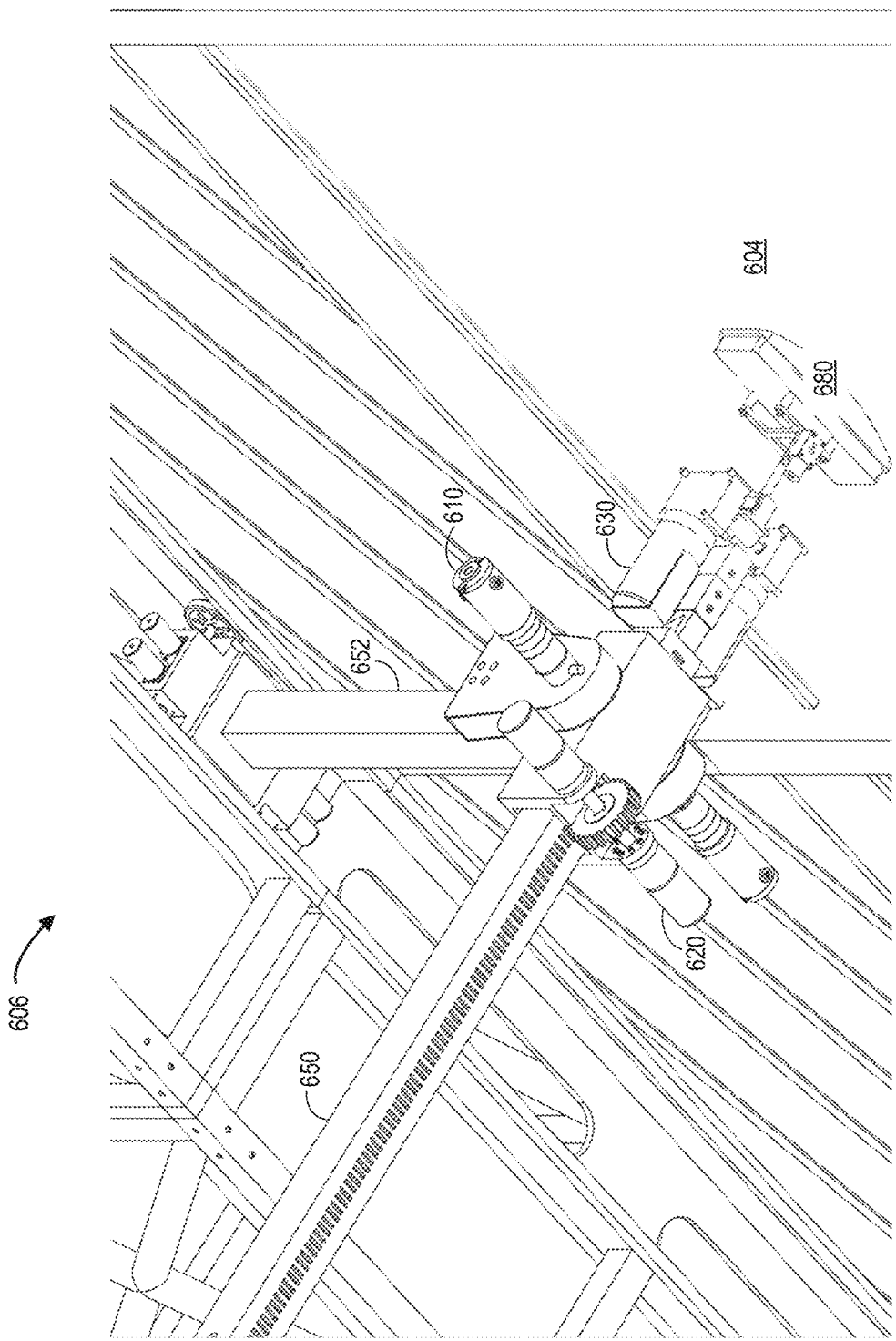

FIGS. 5A through 5D illustrate rotation of a robotic arm according to some embodiments. In particular, FIG. 5A shows a side view 500 of two robotic arms 550: one rotated up and one rotated down. Note that a penetrative imaging portion 580 is positioned vertically (e.g., to inspect a vertical surface) in both cases. The robotic arm 550 may rotate vertically about an axel 510 (e.g., to move the penetrative imaging portion 580 up-and-down). According to some embodiments, teeth of a gear 520 may interact with the slots or recesses 454 shown in FIG. 4 to extend the robotic arm 550 during this rotation. FIG. 5B is a side view 502 of a robot arm with a GPR imaging portion 581, and FIG. 5C is a side view 503 of a robot arm with an ultrasonic imaging portion 583. FIG. 5D is a view 504 of two rotated robotic arms. Note that the penetrative imaging portion may be adapted (e.g., to rotate separately from the rotation of the robotic arm) to automatically remain substantially parallel to a surface of a structure being inspected. In some embodiments, the penetrative imaging portion (e.g., GPR or ultrasonic device) stays parallel to a surface because of its own motors at the head. Software may link the motors that (i) extend and retract the arm, (ii) rotate the arm up and down, and (iii) rotate the head up and down. These motors running in tandem may provide human arm mimicry for the robotic system. In some embodiments, the penetrative imaging portion is rotated separately about multiple orthogonal axes of rotation (e.g., pitch, roll, and/or yaw) to achieve various angles of approach and orientation to the surface FIGS. 6A through 6H are more detailed views of a robotic arm 650 in accordance with some embodiments. As shown in FIG. 6A, a pair of rotary motors 610 rotate the entire robotic arm 650 (attached to the frame body via element 652) while another pair of rotary motors 620 extend and retract the robotic arm 650 during rotation to keep a GPR penetrative imaging portion 680 against a surface 604 being inspected. Another pair of rotary motors 630 rotate the entire head of the robotic arm 650 (with FIG. 6B showing an ultrasound embodiment 601 with an ultrasound imaging portion 681). FIG. 6C is a top-down view 602 of a GPR system (with FIG. 6D showing an ultrasound embodiment 603 with an ultrasound imaging portion 681). FIG. 6E is a three-dimensional view 604 of this portion of a GPR apparatus (with FIG. 6F showing an ultrasound embodiment 605 with an ultrasound imaging portion 681). FIG. 6G is yet another three-dimensional view 606 of a GPR system with a robotic arm 650, supporting element 652, penetrative imaging portion 680, and motors 610, 620, 630 in accordance with some embodiments (with FIG. 6H showing an ultrasound embodiment 607 with an ultrasound imaging portion 681).

Figure 7B:
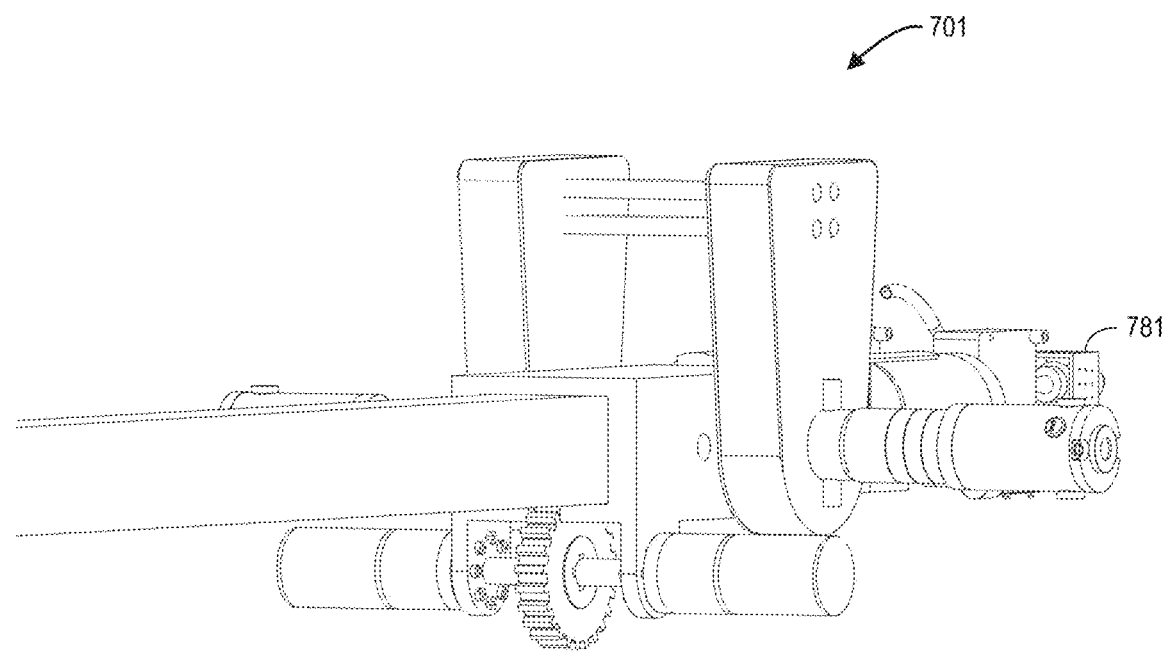
Figure 7C:
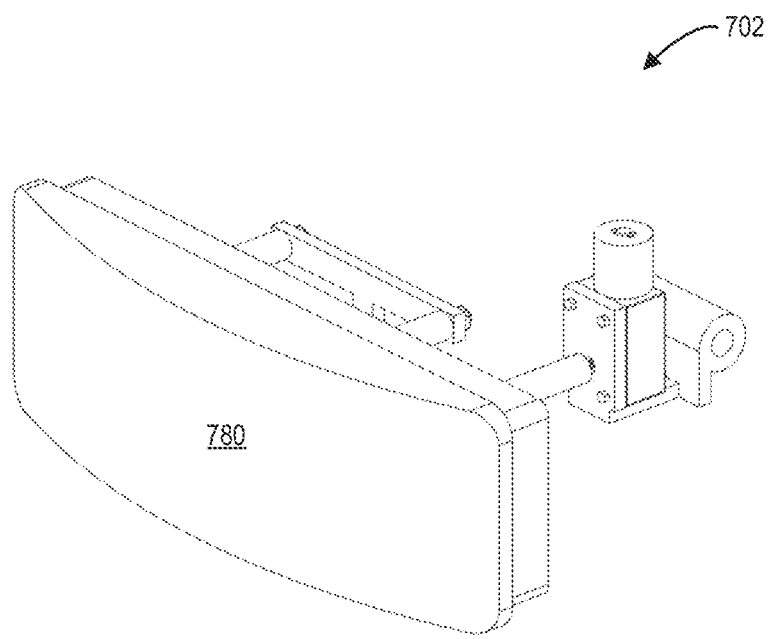
Figure 7D:
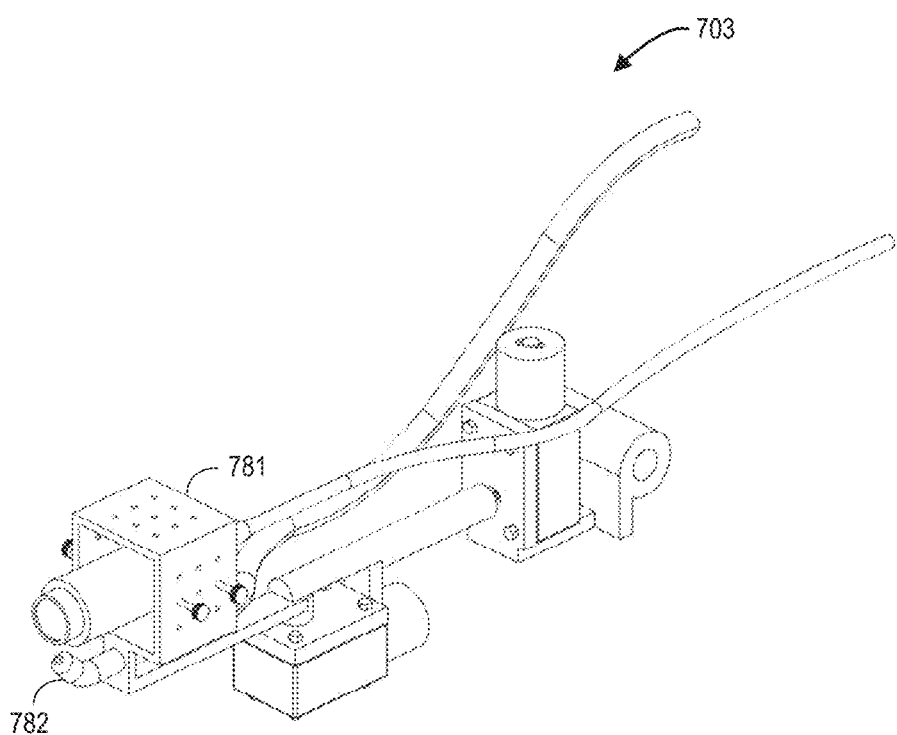

FIG. 7A is a more detailed view 700 of a GPR inspecting head 780 attached to a robotic arm 750 to examine a surface 704. In some embodiments, one or more motors 710 may move or rotate the head 780 (with FIG. 7B showing 701 an ultrasound head 781). FIG. 7C is yet another view 702 of a GPR inspecting head 780, and FIG. 7D is another view 703 of an ultrasound head 782 (including a tube 783 to apply an ultrasound gel to a surface being inspected).

According to some embodiments, a robotic arm affords three orthogonal rotational degrees of freedom: roll, yaw, and pitch. Together, these may allow a scanning element to face the facade at any angle, resulting in a hemispheric range of approaches. This flexibility allows the probe to enter odd recesses and as well as reach behind intricate obstacles. For ultrasound, GPR, and other penetrative scanning methods, the antennas usually resemble high aspect ratio rectangles and do not have rotational symmetry, so the spin movement capability affords the operator superlative flexibility. These motion capabilities are achieved through the combination of binary rotary motors, but can also be swapped with ball joints, sliders, or other mechanical elements as appropriate. For penetrative scans that require surface preparation (e.g., ultrasound may require an ultrasound gel to be placed; other scans may require that a surface is dusted off prior to scanning), these movement capabilities may let an operator prepare the surface and subsequently scan with the same robotic arm.

Figure 8A:
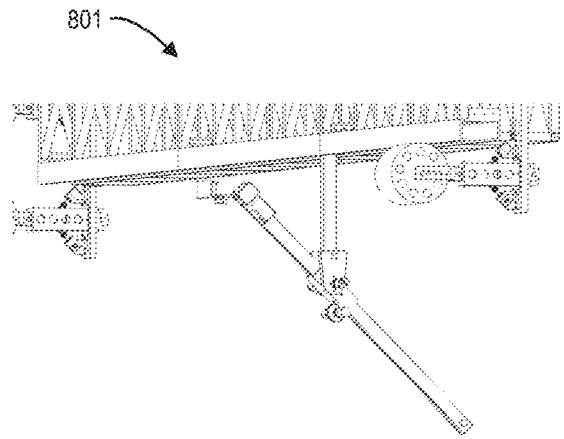
FIGS. 8A through 8X illustrate GPR implementations according to some embodiments.
Figure 8B:
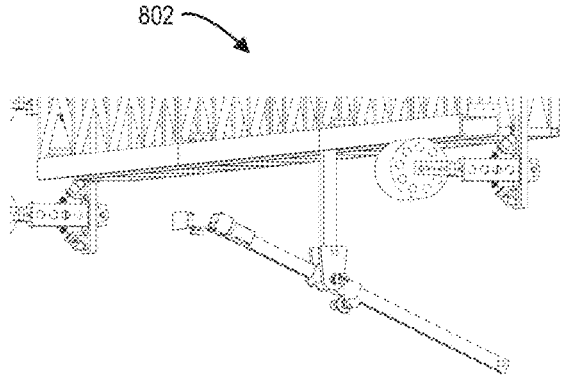
Figure 8C:
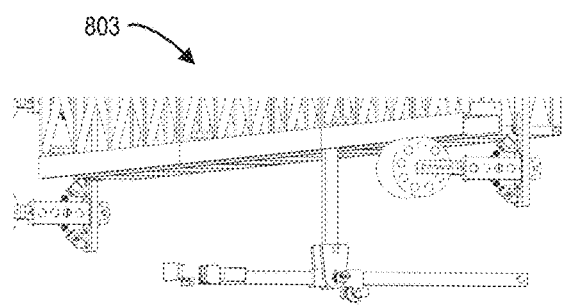
Figure 8D:
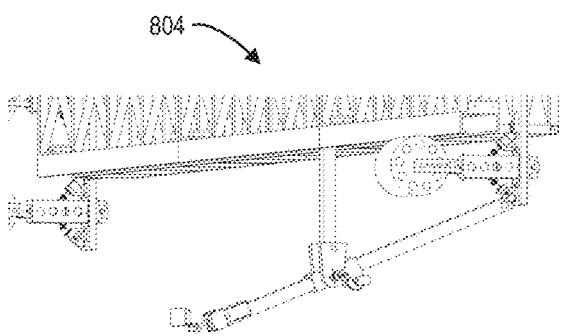
Figure 8E:
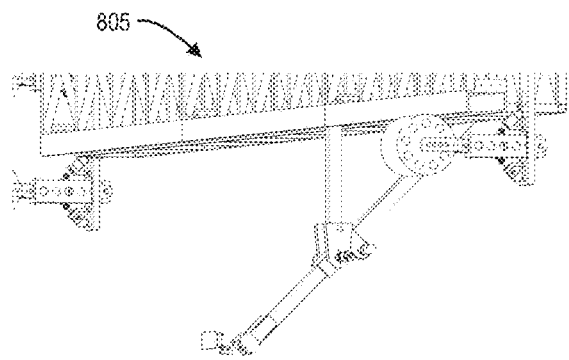
Figure 8F:
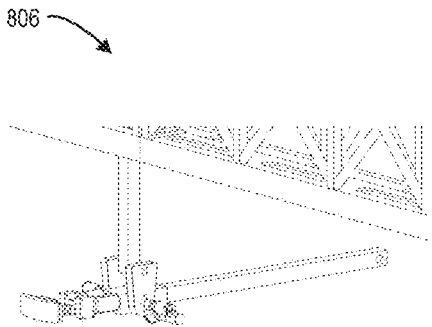
Figure 8G:
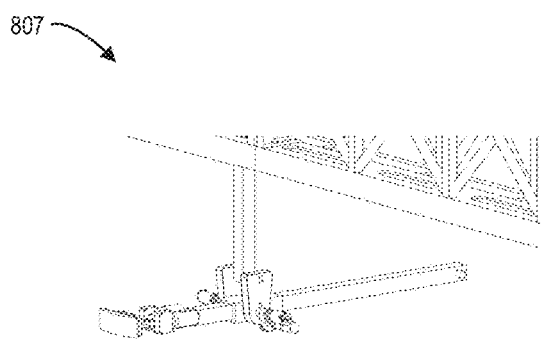
Figure 8H:
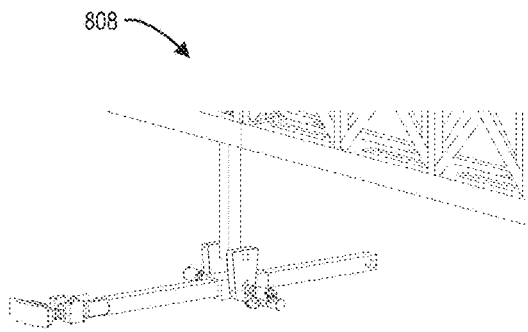
Figure 8I:
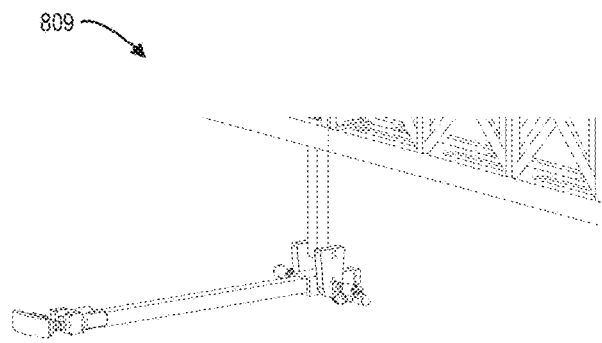
Figure 8J:
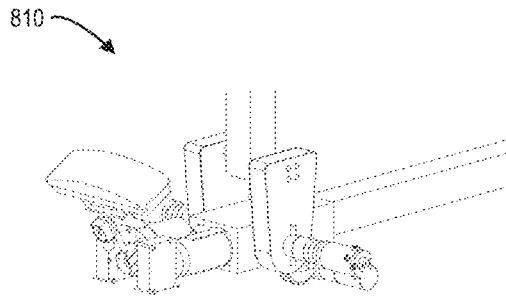
Figure 8K:
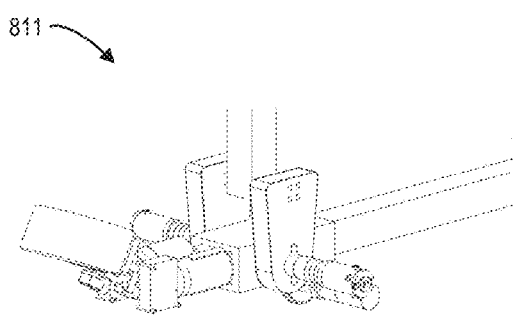
Figure 8L:
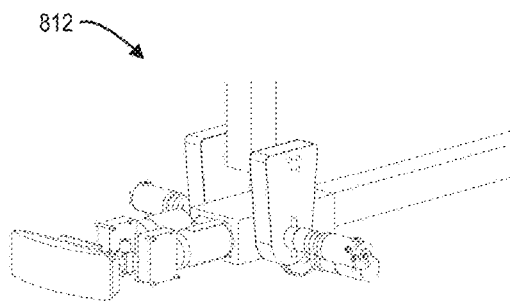
Figure 8M:
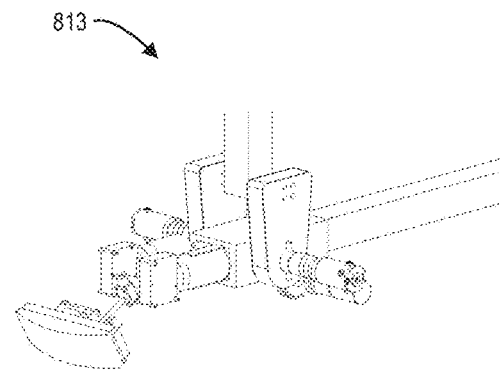
Figure 8N:
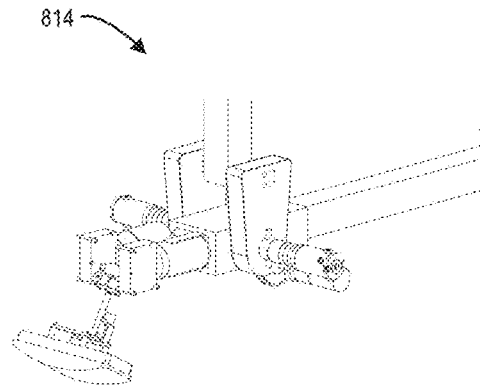
Figure 8O:
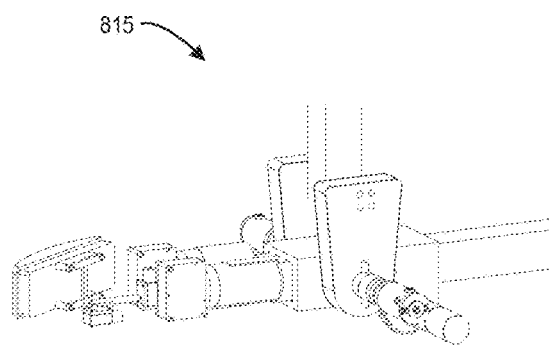
Figure 8P:
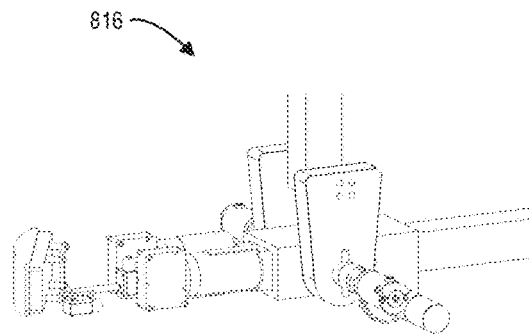
Figure 8Q:
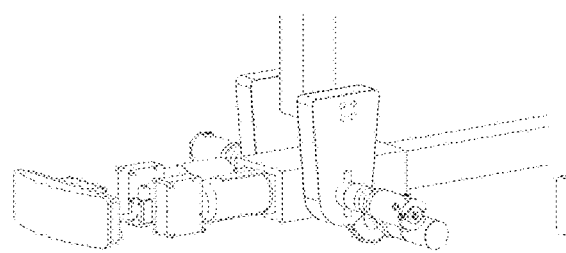
Figure 8R:
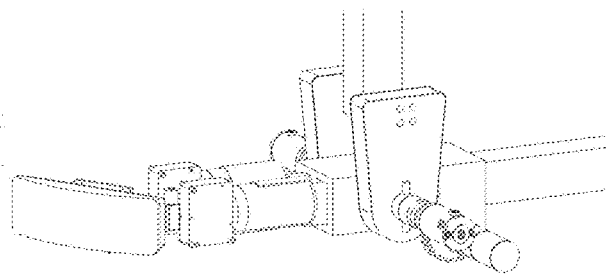
Figure 8S:
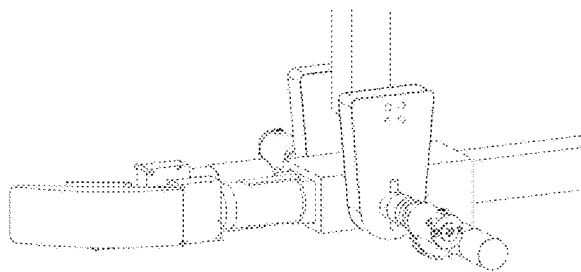
Figure 8T:
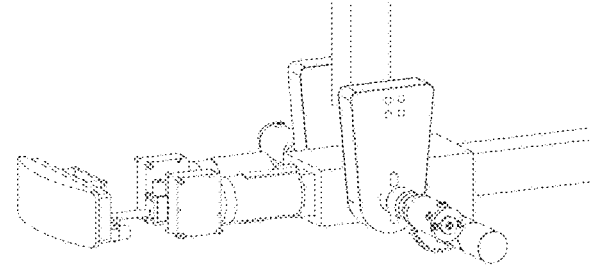
Figure 8U:
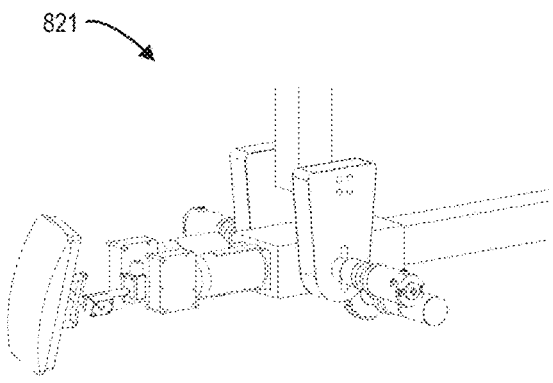
Figure 8V:
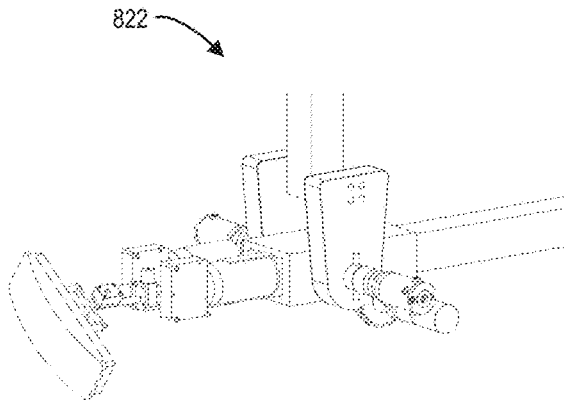
Figure 8W:
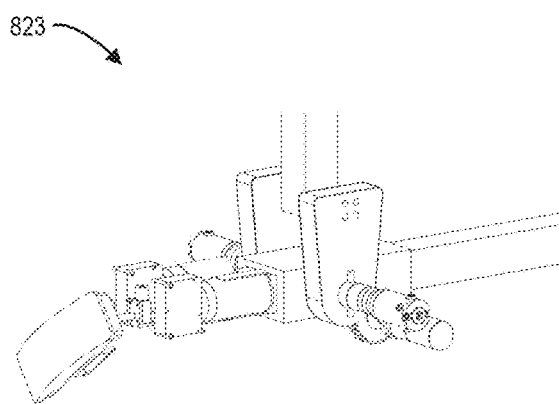
Figure 8X:
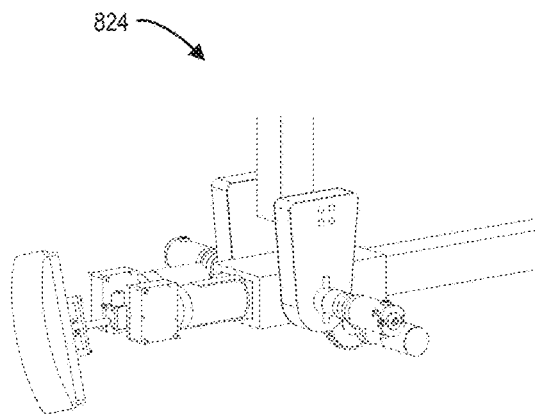

FIGS. 8A through 8X illustrate GPR implementations according to some embodiments. In particular, FIGS. 8A through 8E are views 801, 802, 803, 804, 805 showing rotation of a robotic arm angle for a GPR inspection device. FIGS. 8F through 8I are views 806, 807, 808, 809 showing extension of a robotic arm angle for a GPR inspection device. FIGS. 8J through 8N are views 810, 811, 812, 813, 814 showing angular rotation of a head for a GPR inspection device. Independent angular control allows operators to handle a wide range of exterior elements such as ledges, cavities, overhangs, etc. FIGS. 8O through 8S are views 815, 816, 817, 818, 819 showing rotation of a head for a GPR inspection device, and FIGS. 8T through 8X are views 820, 821, 822, 823, 824 illustrating spin for a head of a GPR inspection device. For asymmetric imaging and scanning elements, this allows operators to approach the building optimally.

Figures 9A, 9B:
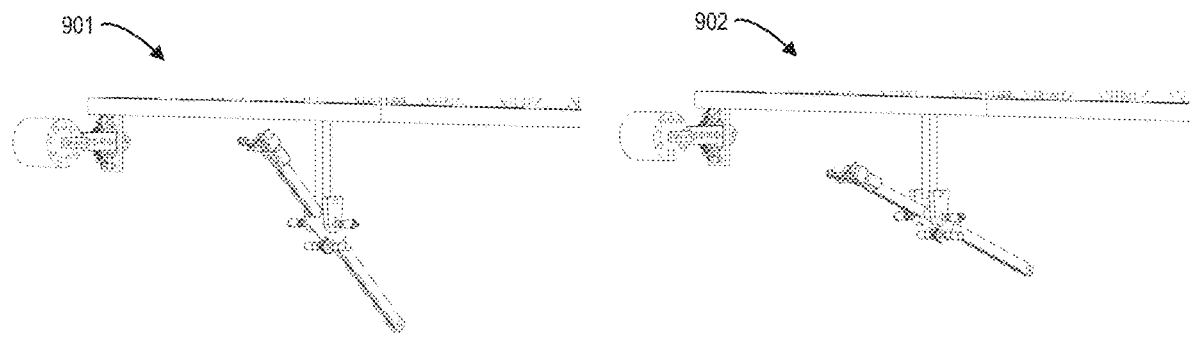
FIGS. 9A through 9X illustrate ultrasound implementations according to some embodiments.
Figures 9C, 9D:
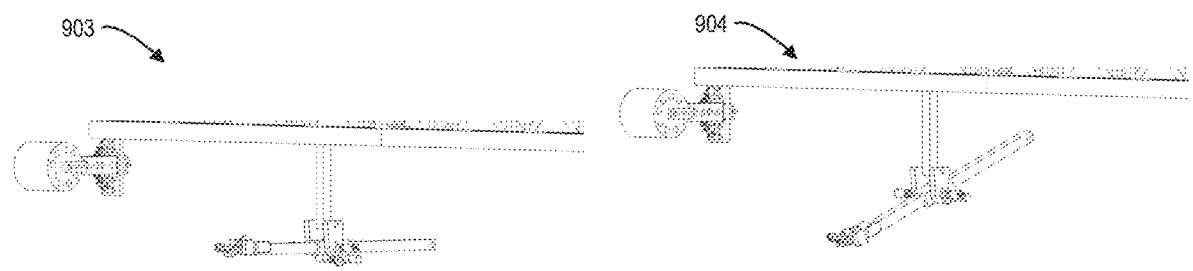
Figure 9E:
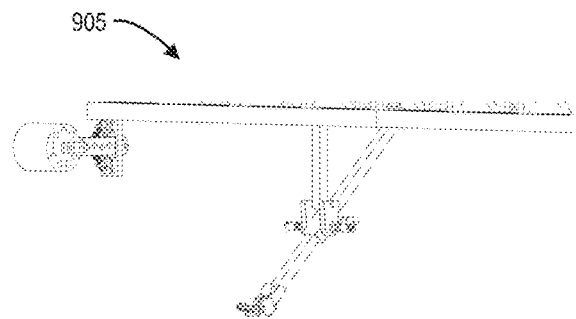
Figure 9F:
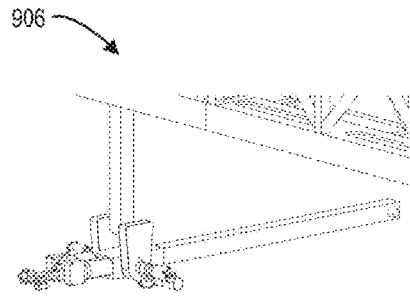
Figure 9G:
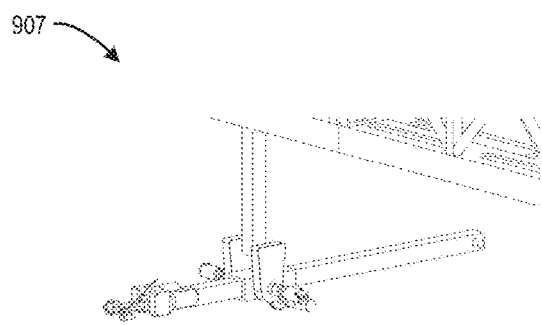
Figure 9H:
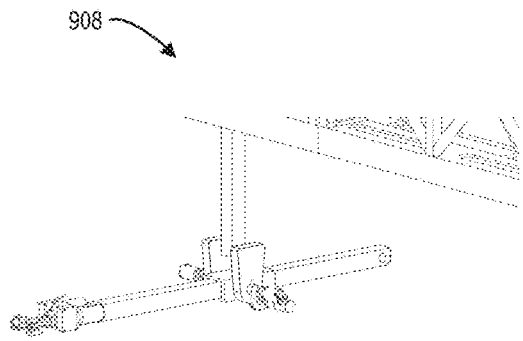
Figure 9M:
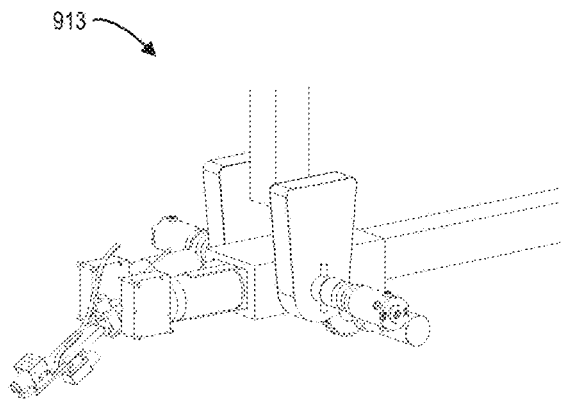
Figure 9N:
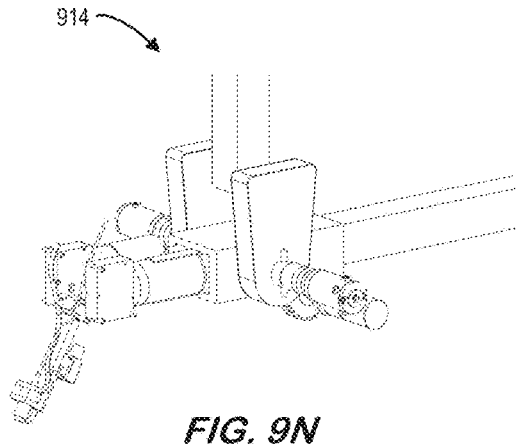
Figure 9O:
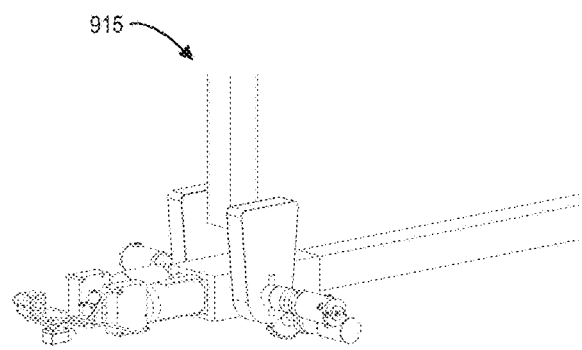
Figure 9P:
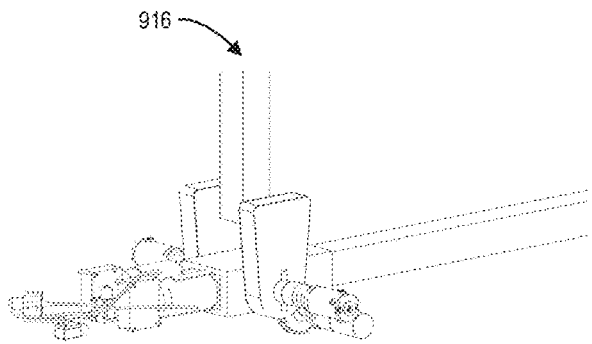
Figure 9Q:
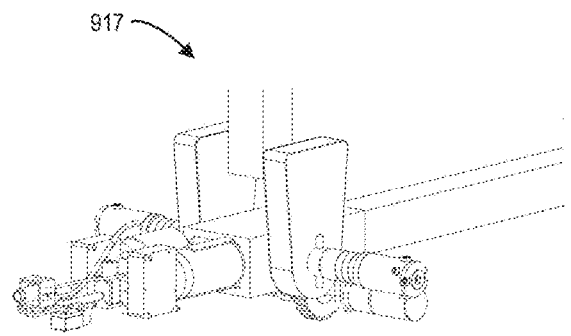
Figure 9R:
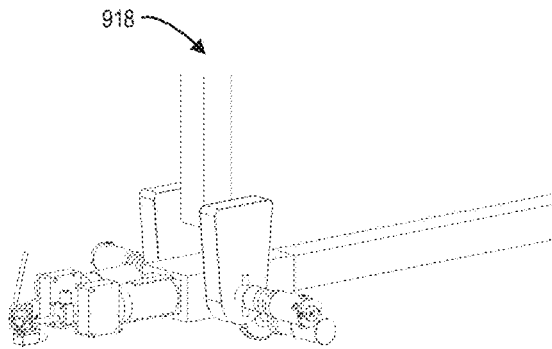
Figure 9S:
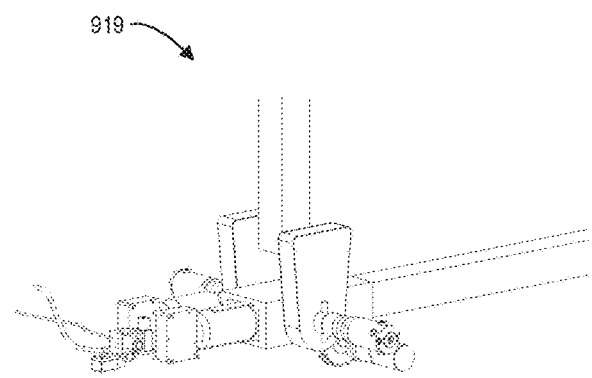
Figure 9T:
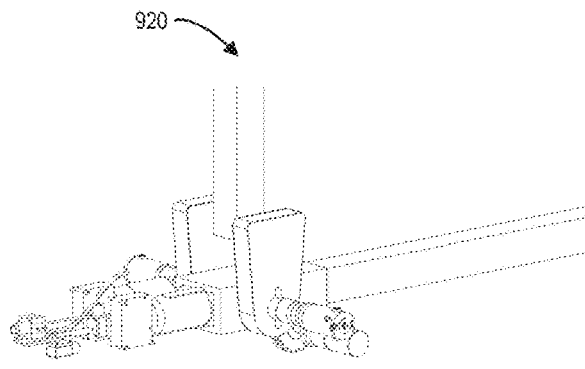
Figure 9U:
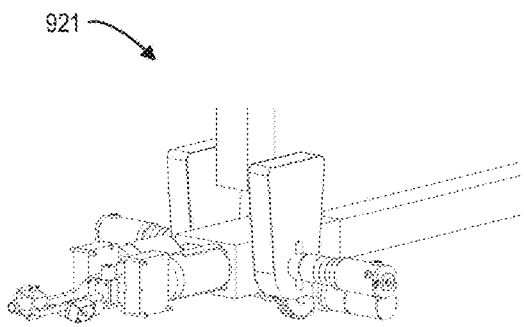
Figure 9V:
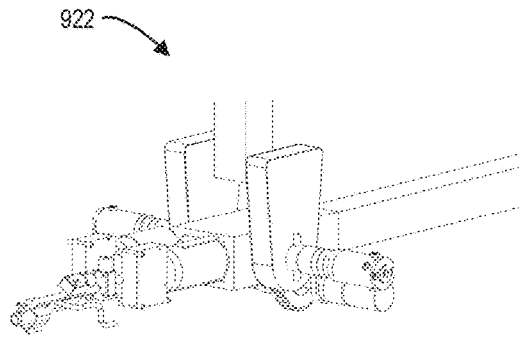
Figure 9W:
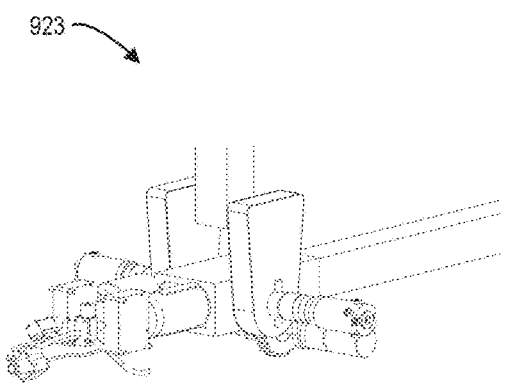
Figure 9X:
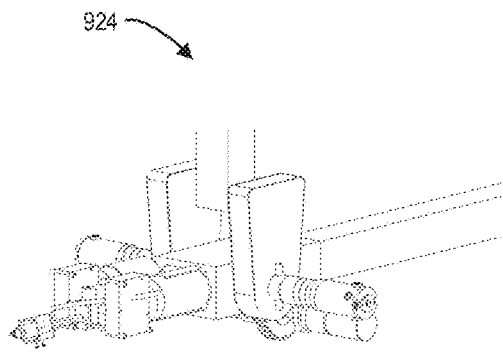

FIGS. 9A through 9X illustrate ultrasonic implementations according to some embodiments. In particular, FIGS. 9A through 9E are views 901, 902, 903, 904, 905 showing rotation of a robotic arm angle for an ultrasonic inspection device. FIGS. 9F through 9I are views 906, 907, 908, 909 showing extension of a robotic arm angle for an ultrasonic inspection device. FIGS. 9J through 9N are views 910, 911, 912, 913, 914 showing angular rotation of a head for an ultrasonic inspection device. FIGS. 9O through 9S are views 915, 916, 917, 918, 919 showing rotation of a head for an ultrasonic inspection device, and FIGS. 9T through 9X are views 920, 921, 922, 923, 924 illustrating spin for a head of an ultrasonic inspection device.

Figure 10A:
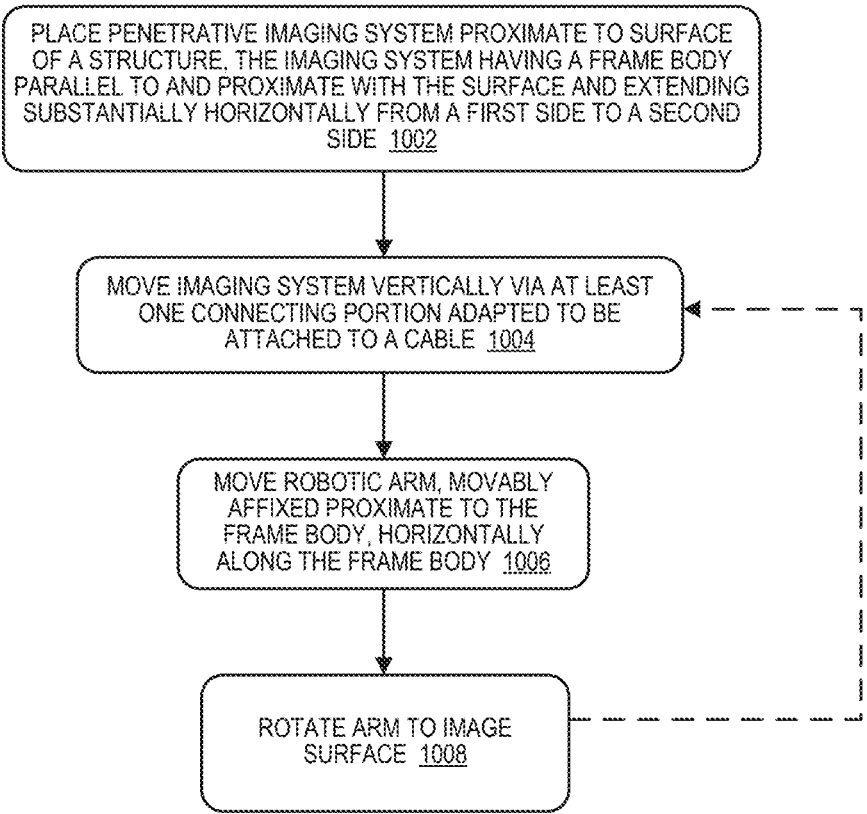
FIG. 10A is a penetrative imaging method in accordance with some embodiments.

In this way, the system may perform penetrative imaging of a surface in an efficient manner at least at par with current industry standards. For example, FIG. 10A illustrates a method that might be performed by some or all of the elements of the systems described herein according to various embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 1002, a penetrative imaging system may be placed proximate to a surface, the penetrative imaging system having a frame body parallel to and proximate with the surface and extending substantially horizontally from a first side to a second side. At 1004, the penetrative imaging system may be moved vertically via at least one connecting portion adapted to be attached to a cable. At 1006, a robotic arm, movably affixed proximate to the frame body, is moved horizontally along the frame body. At 1008, the surface may be imaged with a penetrative imaging portion attached to the robotic arm at an end proximate with the surface. According to some embodiments, this is performed by rotating the robotic arm to vertically move the penetrative imaging portion during penetrative imaging of the surface. Moreover, the penetrative imaging portion may be separately rotated to remain substantially parallel to and proximate with the surface during rotation of the robotic arm. In some embodiments, the penetrative imaging portion is rotated separately about multiple orthogonal axes of rotation (e.g., roll, yaw, and pitch) to achieve various angles of approach and orientation to the surface This process may be adjusted per each building to achieve the desired sampling of the exterior. Multiple approaches may be made at the same point from different angles for structurally significant elements. The overall process may then be repeated at 1004 as illustrated by the dashed arrow in FIG. 10A.

Figure 10B:
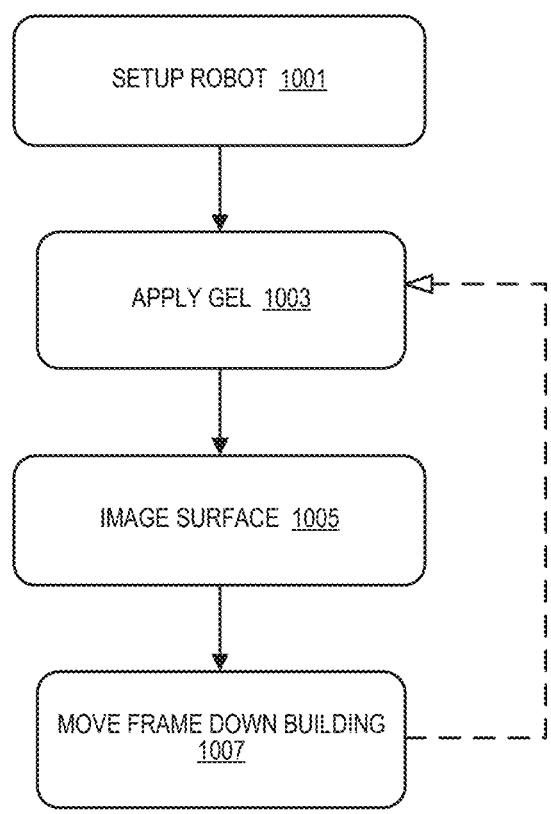
FIG. 10B is another imaging method in accordance with some embodiments.

FIG. 10B is another imaging method in accordance with some embodiments. At 1001, an operator may set up the robot. This may involve, for example, moving the robot modules into place and assembling them. The robot may then be positioned such that the robot is an arm's length below the top-most area to be imaged. The operator may then arrange to inspect the wall. For example, the operator may swing the arm upwards. The arm may then be moved laterally and swung downwards to apply an ultrasound gel to the surface at 1003. Ultrasound gel or another medium may also be applied to small patches as needed. This may be repeated until the desired surface is coated. The operator may then arrange to image the surface at 1005. At 1007, the robot frame may be moved down the building. The gel 1003 and imaging 1005 steps may then be repeated for the entire face of the building as illustrated by the dashed arrow in FIG. 10B.

Figure 11:
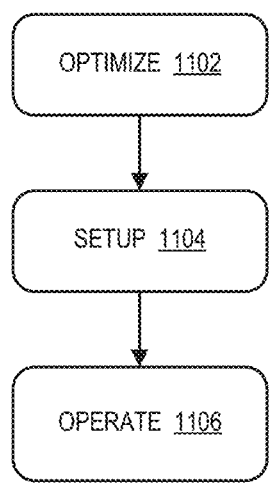
FIG. 11 is an operational method according to some embodiments.

FIG. 11 is an operational method according to some embodiments. At 1102, the system may optimize robot parameters per a given building (that is, many different parameters can be varied easily per building). For example, an overall frame length may be selected, a maximum number of frame modules to optimize horizontal spread may be selected, etc. An operator might also select a buffer spread (e.g., to determine an optimal distance from the building), an imaging device, arm length (e.g., a maximum possible length to optimize reach), etc. In some embodiments, the operator might also specify a gel to be used.

At 1004, the operator may set up the robot. For example, modules may be transported (and each individual piece can be lifted by at most two people). Note that such a robot might be mounted on the ground or roof. The operator may also assemble frame by bolting frame modules together, add a rail car to the frame (e.g., by sliding it into rail), and attach the arm to the railcar. The operator may then attach the buffer and end caps, connect electricity and communication cables, and fill tanks with one or more appropriate penetrative imaging gels. At 1106, the operator may operate the surface penetrating imaging system. For example, the operator may send the robot to an initial altitude (e.g., an arm's length below the topmost surface). Note that the railcar (and entire arm) moves horizontally to inspect the surface. These steps may be repeated as needed for the entire frame's horizontal length, after which the entire robot frame descends by an arm's length. The entire process may be repeated until the entire surface is inspected. Depending on the characteristics and features of a surface, embodiments might instead inspect one surface completely before moving on to inspect another surface.

Note that a human operator may have remote control over all of the robot's functions. Some instructions may be recorded to largely automate the process. Moreover, non-penetrating images of the building face (e.g., normal video) may be recorded while the robot descend for inspection purposes. Note that some or all of the robot's motors may have mechanical locks to prevent damage in the case of a loss of power and/or communication. In some embodiments, limited voltage may limit their maximum possible force to below a surface's tolerance. When power is lost or a mechanical failure occurs, the robot may simply not move and be perfectly safe to bring to the ground or roof. In some embodiments, load cells may be located across the robot as an electronic safety check and to help ensure that appropriate force is applied during inspecting or other penetrative imaging. Moreover, speeds may be digitally and mechanically limited and the robot may operate at a relatively low voltage (e.g., 24 volts). In some embodiments, communications are hardwired. In some cases, wireless communication abilities may be employed. If communications are lost, the robot may simply lock and not move (again being safe to return to the ground or roof). Moreover, portions of the robot may be formed of metal or rubber (and, as a result, nothing may be able to catch on fire).

In some embodiment, multiple robotic arms may be movably affixed proximate to the bottom of the frame body and move horizontally along the frame body during penetrative imaging of the surface. In this case, at least one distance sensor may be employed to prevent collision between robotic arms. Similarly, mechanical absorbers may be installed between the robotic arms and/or at each end of the frame body to avoid damage.

In some embodiments, movement of the robotic arm is controlled by at least one rotary motor and communication with a remote computer. The movement may be controlled, for example, by a human operator via a user interface. Moreover, information associated with the robotic arm, from at least one of several types of cameras (e.g., optical and thermal), may be transmitted to the remote computer in substantially real-time to guide the human operator. In some embodiments, communication is further associated with previously recorded movement commands associated with the surface and/or computer-assisted (e.g., Artificial Intelligence ("AI")) techniques may be employed (to guide or replace a human operator).

Figure 12:
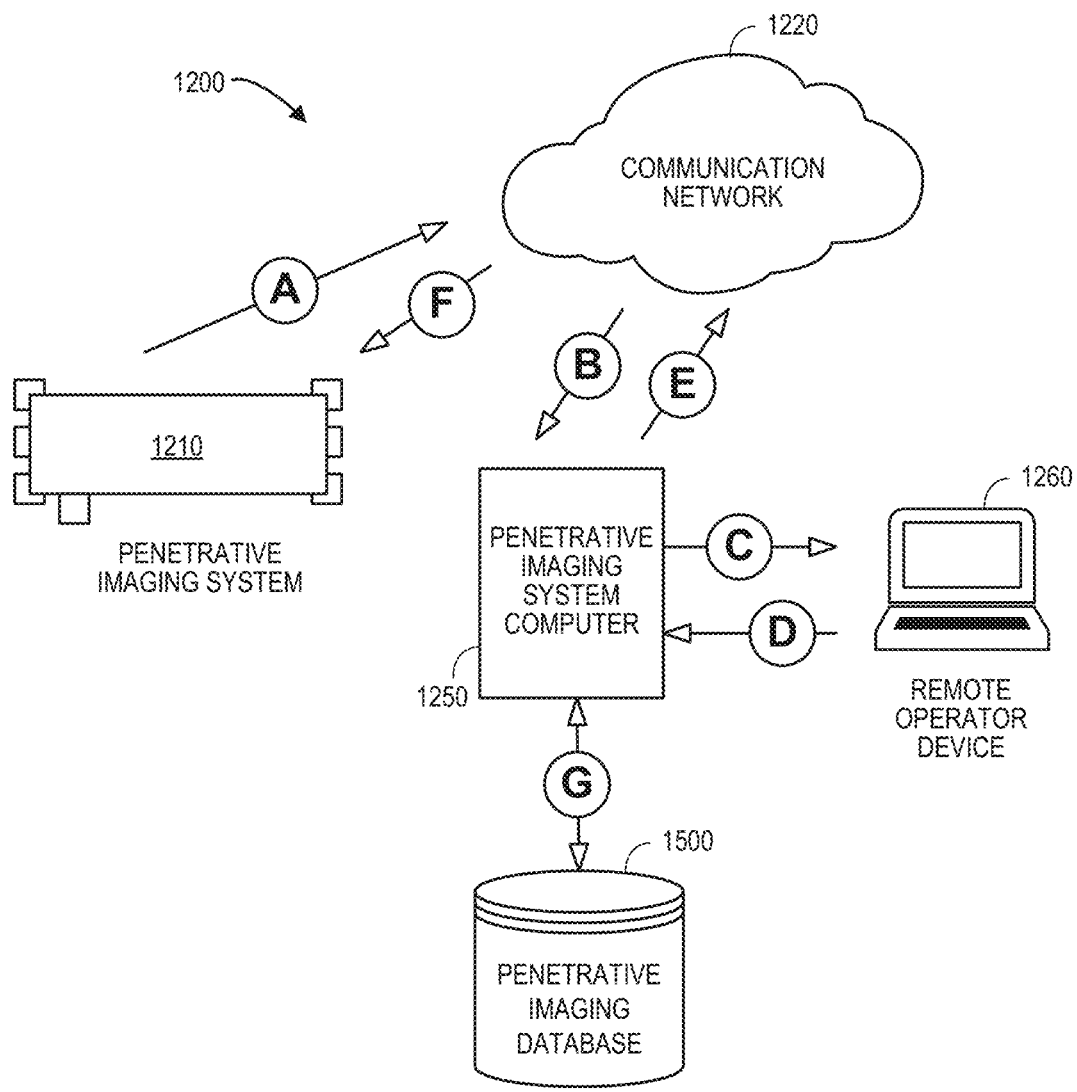
FIG. 12 is a penetrative imaging communication system in accordance with some embodiments.

FIG. 12 is block diagram of a system 1200 according to some embodiments of the present invention. A penetrative imaging system 1210 may exchange information with a penetrative imaging system computer 1250 via a communication network 1220. Some or all of the processes described herein might be performed automatically or be initiated via a command from a remote operator device 1260. As used herein, the term "automatically" may refer to, for example, actions that can be performed with little or no human intervention.

As used herein, devices, including those associated with the system 1200 and any other device described herein, may exchange information via any communication network which may be one or more of a hard-wired network, a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The penetrative imaging system computer 1250 may store information into and/or retrieve information from various data stores (e.g., the penetrative imaging database 1500), which may be locally stored or reside remote from the penetrative imaging system computer 1250. Although a single penetrative imaging system computer 1250 is shown in FIG. 12, any number of such devices may be included. Moreover, various devices described herein might be combined according to embodiments of the present invention. For example, in some embodiments, the penetrative imaging system computer 1250 and penetrative imaging database 1500 might comprise a single apparatus. Any of the system 1200 functions may be performed by a constellation of networked apparatuses, such as in a distributed processing or cloud-based architecture.

A user or administrator may access the system 1200 via the remote operator device 1260 (e.g., a Personal Computer ("PC"), tablet, or smartphone) to view information about, apply penetrative imaging, and/or manage operational information in accordance with any of the embodiments described herein. In some cases, an interactive graphical user interface display may let an operator or administrator define and/or adjust certain parameters (e.g., to define building parameters) and/or provide or receive automatically generated recommendations or results from the system 1200.

Figure 13:
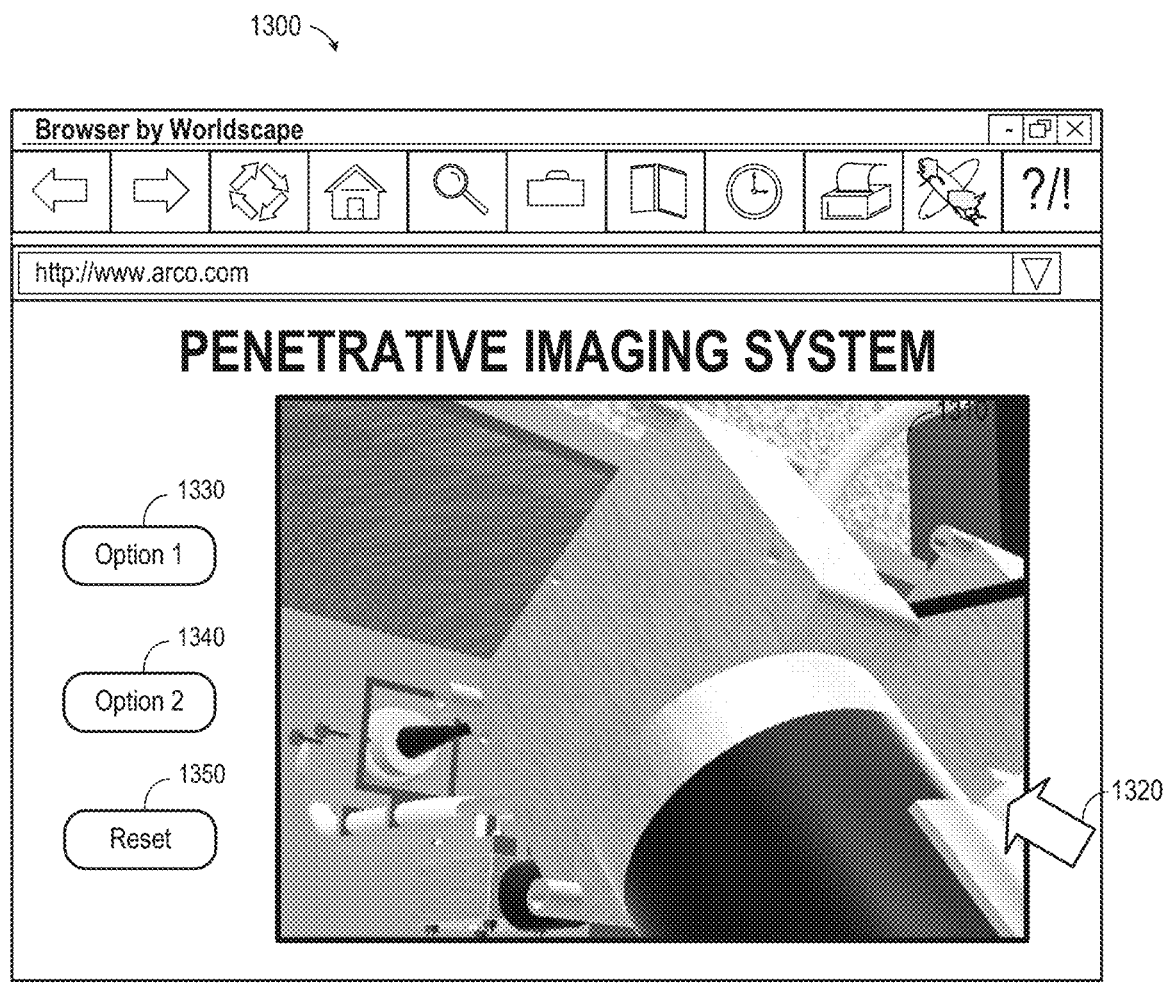
FIG. 13 is a penetrative imaging operator display according to some embodiments.

According to some embodiments, an administrator or operator interface may display various Graphical User Interface ("GUI") elements. For example, FIG. 13 illustrates a penetrative imaging system GUI display 1300 in accordance with some embodiments of the present invention. The display 1300 may include a graphical representation 1310 of an image captured by a camera in substantially real time. According to some embodiments, an administrator or operator may then select an element (e.g., via a touchscreen or computer mouse pointer 1320) to see more information about that element adjust movement of the system. Selection of an "Option 1" icon 1330, "Option 2" icon 1340, or "Reset" icon 1350 may also allow for alteration of the system's operation.

Figure 14:
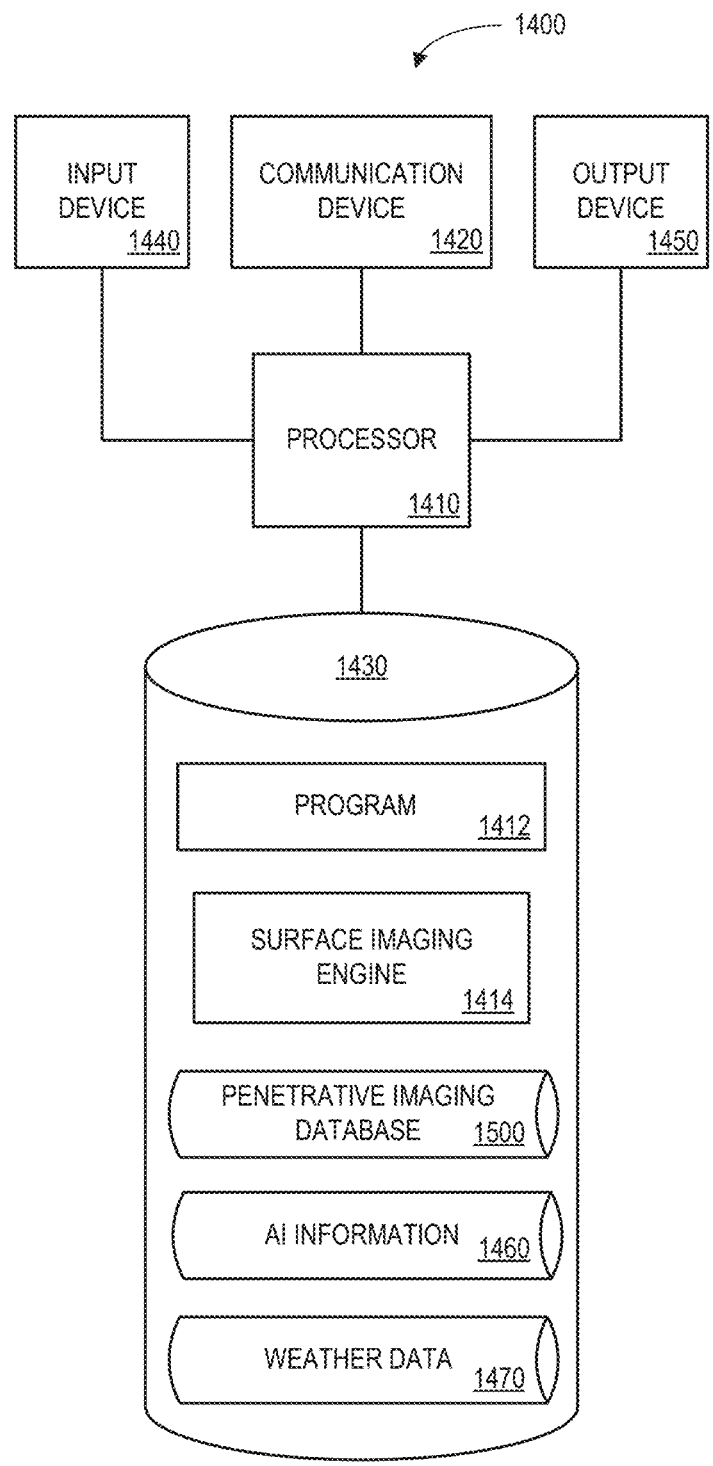
FIG. 14 is a penetrative imaging platform or apparatus in accordance with some embodiments.

The embodiments described herein may be implemented using any number of different hardware configurations. For example, FIG. 14 illustrates a platform or apparatus 1400 that may be, for example, associated with the system 1200 of FIG. 12 as well as the other systems described herein. The apparatus 1400 comprises a processor 1410, such as one or more commercially available Central Processing Units ("CPUs") in the form of one-chip microprocessors, coupled to a communication device 1420 configured to communicate via a communication network (not shown in FIG. 14). The communication device 1420 may be used to communicate, for example, with one or more penetrative imaging systems. The apparatus 1400 further includes an input device 1440 (e.g., a mouse and/or keyboard to define building parameters) and an output device 1450 (e.g., a computer monitor to display reports and penetrative imaging results to an administrator).

The processor 1410 also communicates with a storage device 1430. The storage device 1430 may comprise any appropriate information storage device, including combinations of magnetic storage devices (e.g., a hard disk drive), optical storage devices, mobile telephones, and/or semiconductor memory devices. The storage device 1430 stores a program 1412 and/or a penetrative imaging engine 1414 for controlling the processor 1410. The processor 1410 performs instructions of the programs 1412, 1414, and thereby operates in accordance with any of the embodiments described herein. For example, the processor 1410 may verify that a penetrative imaging system is proximate to a surface, the penetrative imaging system having a frame body parallel to and proximate with the surface and extending substantially horizontally from a first side to a second side. The processor 1410 may then move the penetrative imaging system vertically via at least one connecting portion adapted to be attached to a cable. The processor 1410 may also move a robotic arm, movably affixed proximate to the frame body, horizontally along the frame body and penetrating image the surface with a penetrative imaging portion attached to the robotic arm at an end proximate with the surface.

The programs 1412, 1414 may be stored in a compressed, uncompiled and/or encrypted format. The programs 1412, 1414 may furthermore include other program elements, such as an operating system, a database management system, and/or device drivers used by the processor 1410 to interface with peripheral devices.

As used herein, information may be "received" by or "transmitted" to, for example: (i) the apparatus 1400 from another device; or (ii) a software application or module within the apparatus 1400 from another software application, module, or any other source.

In some embodiments (such as shown in FIG. 14), the storage device 1430 further stores a penetrative imaging database 1500, AI information 1460, and weather data 1470. An example of a database that may be used in connection with the apparatus 1400 will now be described in detail with respect to FIG. 15. Note that the database described herein is only one example, and additional and/or different information may be stored therein. Moreover, various databases might be split or combined in accordance with any of the embodiments described herein.

Referring to FIG. 15, a table is shown that represents the penetrative imaging database 1500 that may be stored at the apparatus 1400 according to some embodiments. The table may include, for example, entries identifying surfaces that have been inspected or otherwise penetrating imaged. The table may also define fields 1502, 1504, 1506, 1508, 1510 for each of the entries. The fields 1502, 1504, 1506, 1508, 1510 may, according to some embodiments, specify: a penetrative imaging system identifier 1502, a building identifier 1504, a date and time 1506, an operator identifier 1508, and recorded movements 1510. The penetrative imaging database 1500 may be created and updated, for example, based on information received from an operator or administrator (e.g., when a new building is inspected).

The penetrative imaging system identifier 1502 may be, for example, a unique alphanumeric code associated with a particular robot. The building identifier 1504 and a date/time 1506 reflect when the surfaces were inspected and the operator identifier 1508 indicates who was controlling the robot during inspecting. The recorded movements 1510 can be used to review what happened (e.g., if something goes wrong) and/or to help the operator (or a new operator) during a subsequent inspection of the same surface.

Thus, embodiments may develop and deploy robots that inspect the exterior surfaces of high-rise buildings and apply time-tested methods and components in a novel robotics package. The approach may achieve superlative safety and efficiency and deliver capabilities beyond inspecting. The wider, adjustable span of the robot grants maximum reach and the robust design permits rapid lateral movement and descent. Embodiments may implement industry exceeding mechanical safety devices alongside computer-aided digital fail-safes. In some embodiments, integrated weatherproofing and aerodynamics let the robot operate during more extreme conditions, in the dark, etc. Moreover, components can readily be swapped, allowing for a wider range of service offerings. Embodiments may be fast, providing multiple descents per day, quicker descent and lateral movement, greater reach and range, etc. Embodiments will provide a safe environment by reducing human error, providing mechanical and digital fail-safes, tolerating harsher winds, rain, and cold, etc.

Although specific hardware and data configurations have been described herein, note that any number of other configurations may be provided in accordance with embodiments of the present invention (e.g., in other types of environments). Moreover, although some embodiments are focused on particular penetrative imaging techniques, any of the embodiments described herein could be applied to other types of penetrative imaging techniques.

Figure 16:
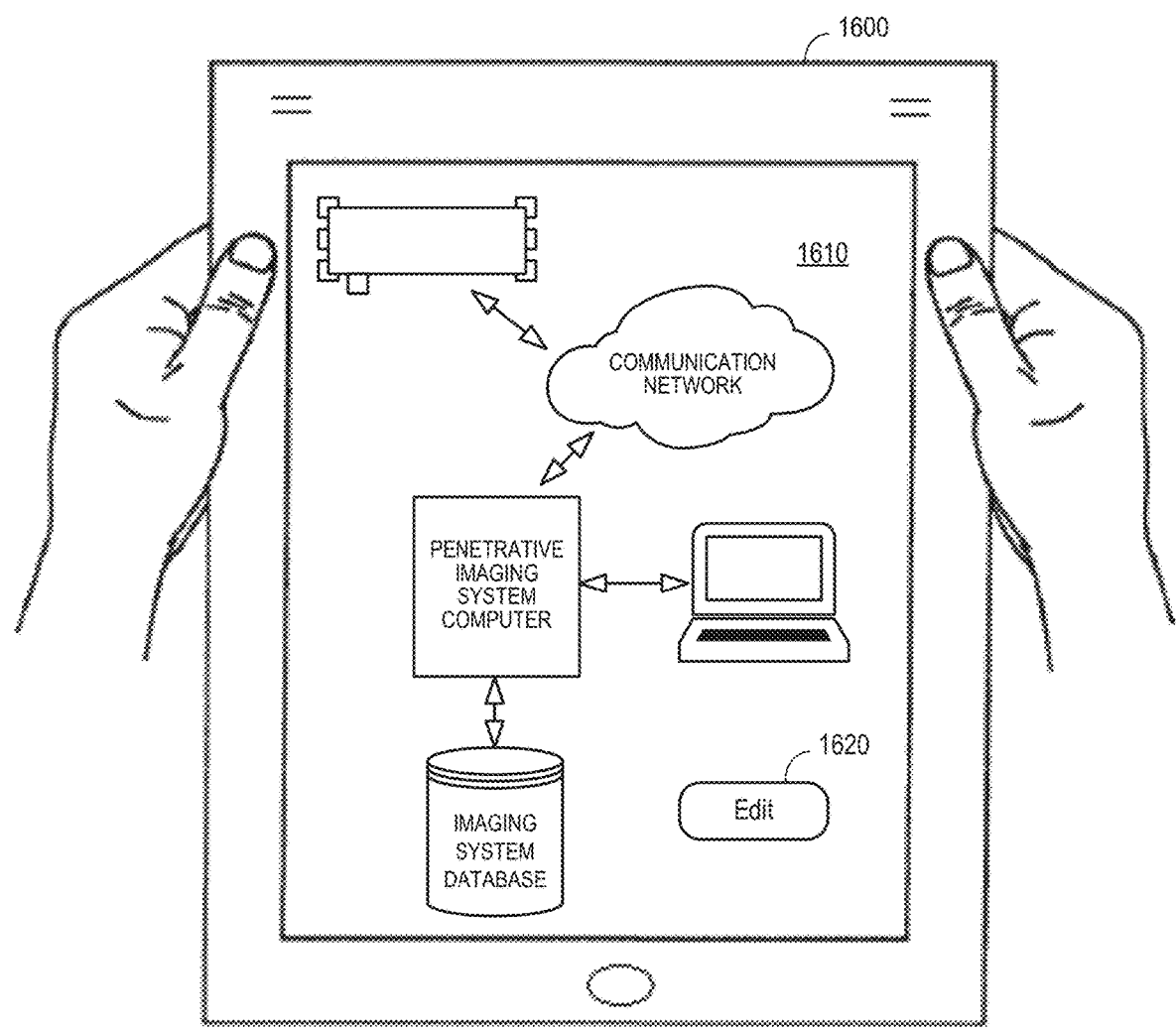
FIG. 16 is a computer tablet in accordance with some embodiments.

FIG. 16 illustrates a wireless or tabular device 1600 displaying elements of a system in accordance with some embodiments of the present invention. For example, in some embodiments, the device 1600 is an iPhone® from Apple, Inc., a BlackBerry® from RIM, a mobile phone using the Google Android® operating system, a portable or tablet computer (such as the iPad® from Apple, Inc.), a mobile device operating the Android® operating system or other portable computing device having an ability to communicate wirelessly or hardwired with a remote entity. The device 1600 presents a display 1610 that may be used to display information about a penetrative imaging system. For example, the elements may be selected by an operator (e.g., via a touchscreen interface of the device 1600) to view more information about that element and/or to adjust settings or parameters associated with that element (e.g., to introduce a new building into the system).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system for penetrative imaging of a structure's substantially vertical surface, comprising:
    a frame body to be positioned parallel to and proximate with the surface and extend substantially horizontally from a first side to a second side;
    at least one connecting portion adapted to be attached to a cable to provide for vertical movement of the frame body;
    a robotic arm movably affixed to the frame body and able to move horizontally along the frame body during penetrative imaging of the surface, the robotic arm extending to an end proximate with the surface; and
    a penetrative imaging portion attached to the robotic arm near the end proximate with the surface,
    wherein the robotic arm is adapted to rotate, vertically moving the penetrative imaging portion during penetrative imaging of the surface, and further wherein the penetrative imaging portion is rotated separately about three orthogonal axes of rotation to achieve various angles of approach and orientation to the surface.

2. The system of claim 1, wherein the penetrative imagine portion is associated with at least one of: (i) a ground penetrating radar device, (ii) an ultrasound device, and (iii) an Eddy current testing device.

3. The system of claim 1, wherein the three orthogonal axes of rotation are associated with: roll, yaw, and pitch.

4. The system of claim 1, wherein the robotic arm is movably affixed proximate to a bottom of the frame body.

5. The system of claim 1, further comprising:
    a first set of buffer portions located proximate the first side to move vertically on the surface; and
    a second set of buffer portions located proximate the second side to move vertically on the surface,
    wherein the first and second sets of buffer portions absorb and distribute impulse via mechanical dampeners and materials.

6. The system of claim 1, wherein the penetrative imaging is associated with inspection for at least one of: (i) hairline cracks, (ii) voids, (iii) other structural defects, and (iv) the location of structural features embedded beneath the surface.

7. The system of claim 1, wherein the penetrative imaging portion is adapted to apply one or more substances onto the vertical surface during penetrative imaging.

8. The system of claim 7, wherein the substance is associated with an ultrasound gel.

9. The system of claim 1, wherein the structure is associated with at least one of: (i) a building, (ii) a multi-story building, (iii) a skyscraper, (iv) an office building, (v) a warehouse, (vi) a stadium, (vii) a wall, (viii) a bridge, (ix) a monument, (x) a dam, (xi) an apartment building, (xii) an airport structure, and (xiii) a man-made structure with at least 10,000 square feet of exterior surfaces.

10. The system of claim 1, wherein the substantially vertical surface is associated with at least one of: (i) a wall, (ii) masonry, (iii) brick, (iv) stone, (v) steel, (vi) concrete, (vii) cement, (viii) iron and alloys, (ix) terracotta, and (x) metal.

11. The system of claim 1, wherein the robotic arm moves horizontally along a rail car and track of the frame body via at least one rotary motor.

12. The system of claim 1, wherein the at least one connecting portion attaches to the cable via tethering latches and rigs.

13. The system of claim 1, wherein movement of the robotic arm is controlled by at least one rotary motor and communication with a remote computer.

14. The system of claim 13, wherein the movement is controlled by a human operator via a user interface.

15. The system of claim 1, wherein a plurality of robotic arms are movably affixed proximate to the bottom of the frame body and move horizontally along the frame body during penetrative imaging of the surface, further comprising:
    at least one distance sensor to prevent collision between robotic arms;
    mechanical absorbers between the robotic arms; and
    mechanical absorbers at each end of the frame body.

16. The system of claim 1, wherein the frame body is modular such that it can be easily transported and individual components can be replaced.

17. The system of claim 1, wherein movement of the robotic arm is associated with at least one self-locking motor that does not move in the event of a failure.

18. A method for penetrative imaging of a structure's substantially vertical surface, comprising:
    placing a penetrative imaging system proximate to the surface, the penetrative imaging system having a frame body parallel to and proximate with the surface and extending substantially horizontally from a first side to a second side;
    moving the penetrative imaging system vertically via at least one connecting portion adapted to be attached to a cable;
    moving a robotic arm, movably affixed proximate to the frame body, horizontally along the frame body; and
    performing penetrative imaging of the surface with a penetrative imaging portion attached to the robotic arm at an end proximate with the surface, wherein the robotic arm is adapted to rotate, vertically moving the penetrative imaging portion during penetrative imaging of the surface, and further wherein the penetrative imaging portion is rotated separately about three orthogonal axes of rotation to achieve various angles of approach and orientation to the surface.

19. The method of claim 18, wherein the penetrative imagine portion is associated with at least one of: (i) a ground penetrating radar device, (ii) an ultrasound device, and (iii) an Eddy current testing device.

20. The method of claim 18, wherein the three orthogonal axes of rotation are associated with: roll, yaw, and pitch.

* * * * *